(12) United States Patent
Choi et al.

(10) Patent No.: US 11,070,842 B2
(45) Date of Patent: Jul. 20, 2021

(54) VIDEO DECODING METHOD AND APPARATUS AND VIDEO ENCODING METHOD AND APPARATUS

(71) Applicant: SAMSUNG ELECTRONICS CO., LTD., Suwon-si (KR)

(72) Inventors: Kiho Choi, Suwon-si (KR); Jinyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/959,005

(22) PCT Filed: Dec. 28, 2018

(86) PCT No.: PCT/KR2018/016849
§ 371 (c)(1),
(2) Date: Jun. 29, 2020

(87) PCT Pub. No.: WO2019/135558
PCT Pub. Date: Jul. 11, 2019

(65) Prior Publication Data
US 2020/0336764 A1 Oct. 22, 2020

Related U.S. Application Data

(60) Provisional application No. 62/612,759, filed on Jan. 2, 2018.

(51) Int. Cl.
*H04N 19/61* (2014.01)
*H04N 19/105* (2014.01)
*H04N 19/184* (2014.01)

(52) U.S. Cl.
CPC ........... *H04N 19/61* (2014.11); *H04N 19/105* (2014.11); *H04N 19/184* (2014.11)

(58) Field of Classification Search
None
See application file for complete search history.

(56) References Cited

U.S. PATENT DOCUMENTS

| 9,762,905 B2 | 9/2017 | Kang et al. |
| 10,575,011 B2 | 2/2020 | Park et al. |

(Continued)

FOREIGN PATENT DOCUMENTS

| KR | 10-2015-0132536 A | 3/2019 |
| WO | 2017/076221 A1 | 5/2017 |

(Continued)

OTHER PUBLICATIONS

Communication dated Apr. 3, 2019 issued by the International Searching Authority in counterpart Application No. PCT/KR2018/016849 (PCT/ISA/220, PCT/ISA/210, and PCT/ISA/237).

*Primary Examiner* — Talha M Nawaz
(74) *Attorney, Agent, or Firm* — Sughrue Mion, PLLC

(57) ABSTRACT

In video encoding and decoding processes, in order to add a motion vector when the motion vector is insufficient in a motion vector prediction value candidate list of a current block, provided are method and apparatus for determining a base motion vector in a motion vector candidate list, determining the motion vector candidate list including an additional motion vector candidate determined based on the determined base motion vector and predetermined offset information, and determining a motion vector of the current block by using an additional motion vector candidate determined in the motion vector candidate list.

9 Claims, 23 Drawing Sheets

(56) References Cited

U.S. PATENT DOCUMENTS

| | | | |
|---|---|---|---|
| 2014/0241434 A1* | 8/2014 | Lin | H04N 19/597 |
| | | | 375/240.16 |
| 2014/0286421 A1* | 9/2014 | Kang | H04N 19/51 |
| | | | 375/240.16 |
| 2017/0332095 A1* | 11/2017 | Zou | H04N 19/567 |
| 2020/0221087 A1* | 7/2020 | Tamse | H04N 19/54 |

FOREIGN PATENT DOCUMENTS

| | | |
|---|---|---|
| WO | 2017/084512 A1 | 5/2017 |
| WO | 2017/052081 A1 | 3/2019 |

* cited by examiner

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

VIDEO DECODING METHOD AND APPARATUS AND VIDEO ENCODING METHOD AND APPARATUS

TECHNICAL FIELD

The disclosure relates to a video decoding method and a video decoding apparatus, and more particularly, to a method and apparatus for configuring a motion vector predictor (MVP) list.

BACKGROUND ART

Image data is encoded by a codec according to a preset data compression standard, for example, a moving picture expert group (MPEG) standard, and then is stored in the form of bitstreams in a recording medium or transmitted through a communication channel.

With development and supply of hardware capable of reproducing and storing high-resolution or high-definition image content, there is an increasing need for a codec for effectively encoding or decoding high-resolution or high-definition image content. Encoded image content may be reproduced by being decoded. Recently, methods for effectively compressing the high-resolution or high-definition image content are being performed. For example, methods for effectively implementing image compression technology through a process of arbitrarily splitting images to be encoded or rendering data are proposed.

As one of techniques for rendering data, because a motion of adjacent blocks is similar to that of a current block, it is general to configure a motion vector predictor (MVP) list by using spatial or temporal neighboring blocks on which motion prediction has been performed, and then to determine a motion vector of the current block by using the MVP list.

DESCRIPTION OF EMBODIMENTS

Technical Problem

Provided are a method and apparatus for, in a video, determining whether to add a motion vector to a motion vector candidate list of a current block, when it is determined to add the motion vector, determining a base motion vector in the motion vector candidate list, determining the motion vector candidate list including an additional motion vector candidate determined based on the base motion vector and predetermined offset information, and determining a motion vector of the current block by using the additional motion vector candidate determined in the motion vector candidate list.

Solution to Problem

To solve the technical problem, the disclosure provides a video decoding method including: determining whether to add a motion vector to a motion vector candidate list of a current block; when it is determined to add the motion vector, determining a base motion vector in the motion vector candidate list; determining the motion vector candidate list including an additional motion vector candidate determined based on the base motion vector and predetermined offset information; and determining a motion vector of the current block by using the additional motion vector candidate determined in the motion vector candidate list.

To solve the technical problem, the disclosure provides a video decoding apparatus including: a memory; and at least one processor connected with the memory, wherein the at least one processor is configured to determine whether to add a motion vector to a motion vector candidate list of a current block, when it is determined to add the motion vector, determine a base motion vector in the motion vector candidate list, determine the motion vector candidate list including an additional motion vector candidate determined based on the base motion vector and predetermined offset information, and determine a motion vector of the current block by using the additional motion vector candidate determined in the motion vector candidate list.

To solve the technical problem, the disclosure provides a video encoding method including: determining whether to add a motion vector to a motion vector candidate list of a current block; when it is determined to add the motion vector, determining a base motion vector in the motion vector candidate list; determining the motion vector candidate list including an additional motion vector candidate determined based on the base motion vector and predetermined offset information; and determining a motion vector difference value and a reference index of the current block by using the additional motion vector candidate determined in the motion vector candidate list.

To solve the technical problem, the disclosure provides a video encoding apparatus including: a memory; and at least one processor connected with the memory, wherein the at least one processor is configured to determine whether to add a motion vector to a motion vector candidate list of a current block, when it is determined to add the motion vector, determine a base motion vector in the motion vector candidate list, determine the motion vector candidate list including an additional motion vector candidate determined based on the base motion vector and predetermined offset information, and determine a motion vector difference value and a reference index of the current block by using the additional motion vector candidate determined in the motion vector candidate list.

Advantageous Effects of Disclosure

In video encoding and decoding processes, in order to add a motion vector when the motion vector is insufficient in a motion vector prediction value candidate list of a current block, a base motion vector may be determined in a motion vector candidate list, an additional motion vector candidate may be determined based on the determined base motion vector and predetermined offset information, and then the additional motion vector candidate may be added to the motion vector candidate list, such that efficiency in motion vector prediction may be improved.

BRIEF DESCRIPTION OF DRAWINGS

FIG. 13 illustrates a process of determining a depth of a coding unit as a shape and size of the coding unit change, when the coding unit is recursively split such that a plurality of coding units are determined, according to an embodiment.

BEST MODE

Figure 1:
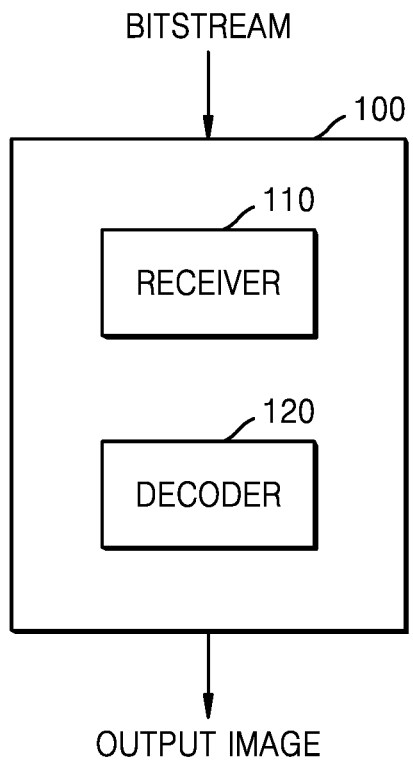
FIG. 1 is a schematic block diagram of an image decoding apparatus according to an embodiment.

According to an embodiment of the disclosure, a video decoding method may include: determining whether to add a motion vector to a motion vector candidate list of a current block; when it is determined to add the motion vector, determining a base motion vector in the motion vector candidate list; determining the motion vector candidate list including an additional motion vector candidate determined based on the base motion vector and predetermined offset information; and determining a motion vector of the current block by using the additional motion vector candidate determined in the motion vector candidate list.

According to an embodiment, a prediction mode of the current block may be one of a skip mode, a merge mode, and an inter mode.

According to an embodiment, the base motion vector may be selected from among motion vectors of adjacent blocks neighboring the current block.

According to an embodiment, a plurality of motion vectors may be determined as the base motion vector.

According to an embodiment, the predetermined offset information may include at least one offset value.

According to an embodiment, in a bi-directional prediction, the base motion vector may include motion vectors of a reference list L0 and a reference list L1.

According to an embodiment, in a uni-directional prediction, the base motion vector may include one motion vector.

According to an embodiment, the base motion vector may include a motion vector that is not selected in a process of configuring the motion vector candidate list.

According to an embodiment, when a prediction mode of the current block is one of a skip affine mode, a merge affine mode, and an inter affine mode, the motion vector, the base motion vector, and the additional motion vector candidate of the motion vector candidate list may be affine-transformed motion vectors.

According to an embodiment, the affine-transformed motion vectors may be 4 affine parameters According to an embodiment, the affine-transformed motion vectors may be 6 affine parameters.

According to an embodiment, the predetermined offset information may include a value obtained from signaled information.

According to an embodiment of the disclosure, a video encoding method may include: determining whether to add a motion vector to a motion vector candidate list of a current block; when it is determined to add the motion vector, determining a base motion vector in the motion vector candidate list; determining the motion vector candidate list including an additional motion vector candidate determined based on the base motion vector and predetermined offset information; and determining a motion vector difference value and a reference index of the current block by using the additional motion vector candidate determined in the motion vector candidate list.

According to an embodiment of the disclosure, a video decoding apparatus may include: a memory; and at least one processor connected with the memory, wherein the at least one processor is configured to determine whether to add a motion vector to a motion vector candidate list of a current block, when it is determined to add the motion vector, determine a base motion vector in the motion vector candidate list, determine the motion vector candidate list including an additional motion vector candidate determined based on the base motion vector and predetermined offset information, and determine a motion vector of the current block by using the additional motion vector candidate determined in the motion vector candidate list.

MODE OF DISCLOSURE

Advantages and features of embodiments and methods of accomplishing the same may be understood more readily by reference to the embodiments and the accompanying drawings. In this regard, the disclosure may have different forms and should not be construed as being limited to the embodiments set forth herein. Rather, these embodiments are provided so that this disclosure will be thorough and complete and will fully convey the concept of the disclosure to one of ordinary skill in the art.

The terms used in the specification will be briefly defined, and the embodiments will be described in detail.

All terms including descriptive or technical terms which are used in the specification should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Therefore, the terms used in the disclosure should not be interpreted based on only their names but have to be defined based on the meaning of the terms together with the descriptions throughout the specification.

In the following specification, the singular forms include plural forms unless the context clearly indicates otherwise.

When a part "includes" or "comprises" an element, unless there is a particular description contrary thereto, the part may further include other elements, not excluding the other elements.

In the following descriptions, terms such as "unit" indicate software or a hardware component, and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

According to an embodiment of the disclosure, the "unit" may include a processor and a memory. The term "processor" should be interpreted broadly to include a general purpose processor, a central processing unit (CPU), a microprocessor, a digital signal processor (DSP), a controller, a microcontroller, a state machine, and the like. In some circumstances, the "processor" may refer to an application specific semiconductor (ASIC), a programmable logic device (PLD), a field programmable gate array (FPGA), or the like. The term "processor" may refer to a combination of processing devices such as, for example, a combination of a DSP and a microprocessor, a combination of a plurality of microprocessors, a combination of one or more microprocessors in conjunction with a DSP core, or a combination of any other such configuration.

The term "memory" should be interpreted broadly to include any electronic component capable of storing electronic information. The term "memory" may refer to various types of processor-readable media, such as a random access memory (RAM), a read-only memory (ROM), a non-volatile random access memory (NVRAM), a programmable read-only memory (PROM), an erase-programmable read-only memory (EPROM), an electrically erasable PROM (EEPROM), a flash memory, a magnetic or optical data storage device, a register, and the like. When the processor can read information from a memory and/or write information to the memory, the memory is said to be in an electronic communication state with the processor. The memory integrated in the processor is in an electronic communication state with the processor.

Hereinafter, an "image" may be a static image such as a still image of a video or may be a dynamic image such as a moving image, that is, the video itself.

Hereinafter, a "sample" denotes data assigned to a sampling position of an image, i.e., data to be processed. For example, pixel values of an image in a spatial domain and transform coefficients on a transform region may be samples. A unit including at least one such sample may be defined as a block.

Hereinafter, embodiments will be described in detail with reference to the accompanying drawings such that one of ordinary skill in the art may easily implement the embodiments. In the drawings, parts irrelevant to the description are omitted to clearly describe the disclosure.

Hereinafter, an image encoding apparatus and an image decoding apparatus, and an image encoding method and an image decoding method according to embodiments will be described with reference to FIGS. 1 to 16. With reference to FIGS. 3 to 16, provided is a method of determining a data unit of an image according to an embodiment, and with reference to FIGS. 17 to 28, provided is a method of determining whether to add a motion vector to a motion vector candidate list of a current block, when it is determined to add the motion vector, determining a base motion vector in the motion vector candidate list, determining the motion vector candidate list including an additional motion vector candidate determined based on the base motion vector and predetermined offset information, and determining a motion vector of the current block by using the additional motion vector candidate determined in the motion vector candidate list. FIG. 29 illustrates a method of deriving a motion vector to be applied to a sample of a current block in an affine mode.

Hereinafter, a method and apparatus for adaptively selecting a context model, based on various shapes of coding units, according to an embodiment of the disclosure, will be described with reference to FIGS. 1 and 2.

FIG. 1 is a schematic block diagram of an image decoding apparatus 100 according to an embodiment.

The image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 2200 to be described below. Also, the bitstream may be transmitted from the image encoding apparatus 2200. The image encoding apparatus 2200 and the image decoding apparatus 100 may be connected in a wired or wireless manner, and the receiver 110 may receive the bitstream by wire or wirelessly. The receiver 110 may receive the bitstream from a storage medium such as an optical medium, a hard disc, or the like. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding apparatus 100 will be described in detail with reference to FIG. 2.

Figure 2:
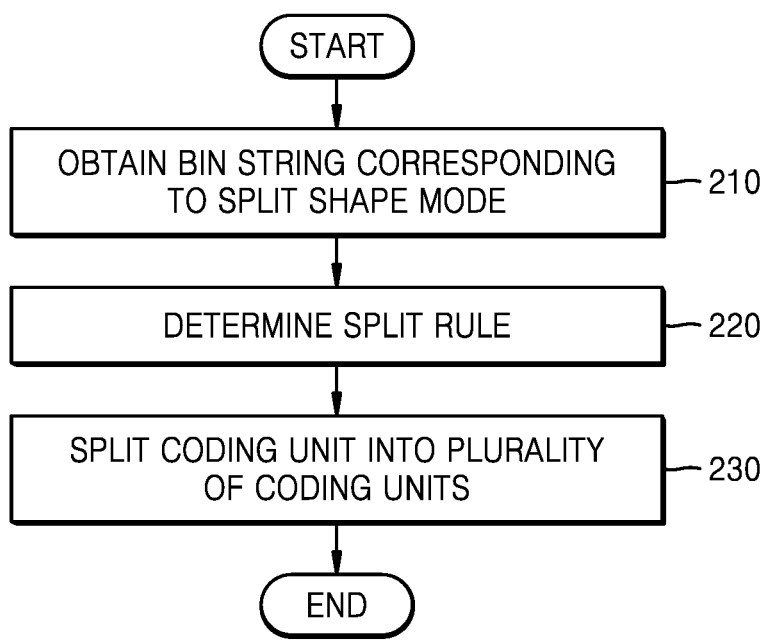
FIG. 2 is a flowchart of an image decoding method according to an embodiment.

FIG. 2 is a flowchart of an image decoding method according to an embodiment.

According to an embodiment of the disclosure, the receiver 110 receives a bitstream.

The image decoding apparatus 100 performs operation 210 of obtaining, from a bitstream, a bin string corresponding to a split shape mode of a coding unit. The image decoding apparatus 100 performs operation 220 of determining a split rule of the coding unit. Also, the image decoding apparatus 100 performs operation 230 of splitting the coding unit into a plurality of coding units, based on at least one of the bin string corresponding to the split shape mode and the split rule. The image decoding apparatus 100 may determine an allowable first range of a size of the coding unit, according to a ratio of the width and the height of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will now be described in detail according to an embodiment of the disclosure.

First, one picture may be split into one or more slices or one or more tiles. One slice or one tile may be a sequence of one or more largest coding units (coding tree units (CTUs)). There is a largest coding block (coding tree block (CTB)) that is conceptually compared to a largest coding unit (CTU).

The largest coding block (CTB) denotes an N×N block including N×N samples (N is an integer). Each color component may be split into one or more largest coding blocks.

When a picture has three sample arrays (sample arrays for Y, Cr, and Cb components, respectively), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, respectively, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because one of ordinary skill in the art may understand that a (largest) coding unit or a (largest) coding block refers to a block of a preset size including a preset number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, an embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is to be quad split (QUAD_SPLIT) or is not to be quad split.

When the current coding unit is not quad split, the information indicating whether multi-splitting is performed may indicate whether the current coding unit is no longer split (NO_SPLIT) or is to be binary/ternary split.

When the current coding unit is binary split or ternary split, the split direction information indicates that the current coding unit is to be split in one of a horizontal direction and a vertical direction.

When the current coding unit is split in the horizontal direction or the vertical direction, the split type information indicates that the current coding unit is to be binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding apparatus 100 may obtain, from the bitstream, the split shape mode information from one bin string. A form of the bitstream received by the image decoding apparatus 100 may include fixed length binary code, unary code, truncated unary code, pre-determined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad-split a coding unit, whether not to split a coding unit, a split direction, and a split type, based on one bin string.

The coding unit may be smaller than or equal to the largest coding unit. For example, because a largest coding unit is a coding unit having a maximum size, the largest coding unit is one of coding units. When split shape mode information about a largest coding unit indicates that splitting is not to be performed, a coding unit determined in the largest coding unit has the same size as that of the largest coding unit. When split shape code information about a largest coding unit indicates that splitting is to be performed, the largest coding unit may be split into coding units. Also, when split shape mode information about a coding unit indicates that splitting is to be performed, the coding unit may be split into smaller coding units. However, the splitting of the image is not limited thereto, and the largest coding unit and the coding unit may not be distinguished. The splitting of the coding unit will be described in detail with reference to FIGS. 3 through 16.

Also, one or more prediction blocks for prediction may be determined from a coding unit. The prediction block may be equal to or smaller than the coding unit. Also, one or more transform blocks for transformation may be determined from a coding unit. The transform block may be equal to or smaller than the coding unit.

The shapes and sizes of the transform block and prediction block may not be related to each other.

In another embodiment, prediction may be performed by using a coding unit as a prediction unit. Also, transformation may be performed by using a coding unit as a transform block.

The splitting of the coding unit will be described in detail with reference to FIGS. 3 to 16. A current block and an adjacent block of the disclosure may indicate one of the largest coding unit, the coding unit, the prediction block, and the transform block. Also, the current block or the current coding unit is a block that is currently being decoded or encoded or a block that is currently being split. The adjacent block may be a block that is reconstructed before the current block. The adjacent block may be spatially or temporally adjacent to the current block. The adjacent block may be located at one of the lower left, left, upper left, top, upper right, right, lower right of the current block.

Figure 3:
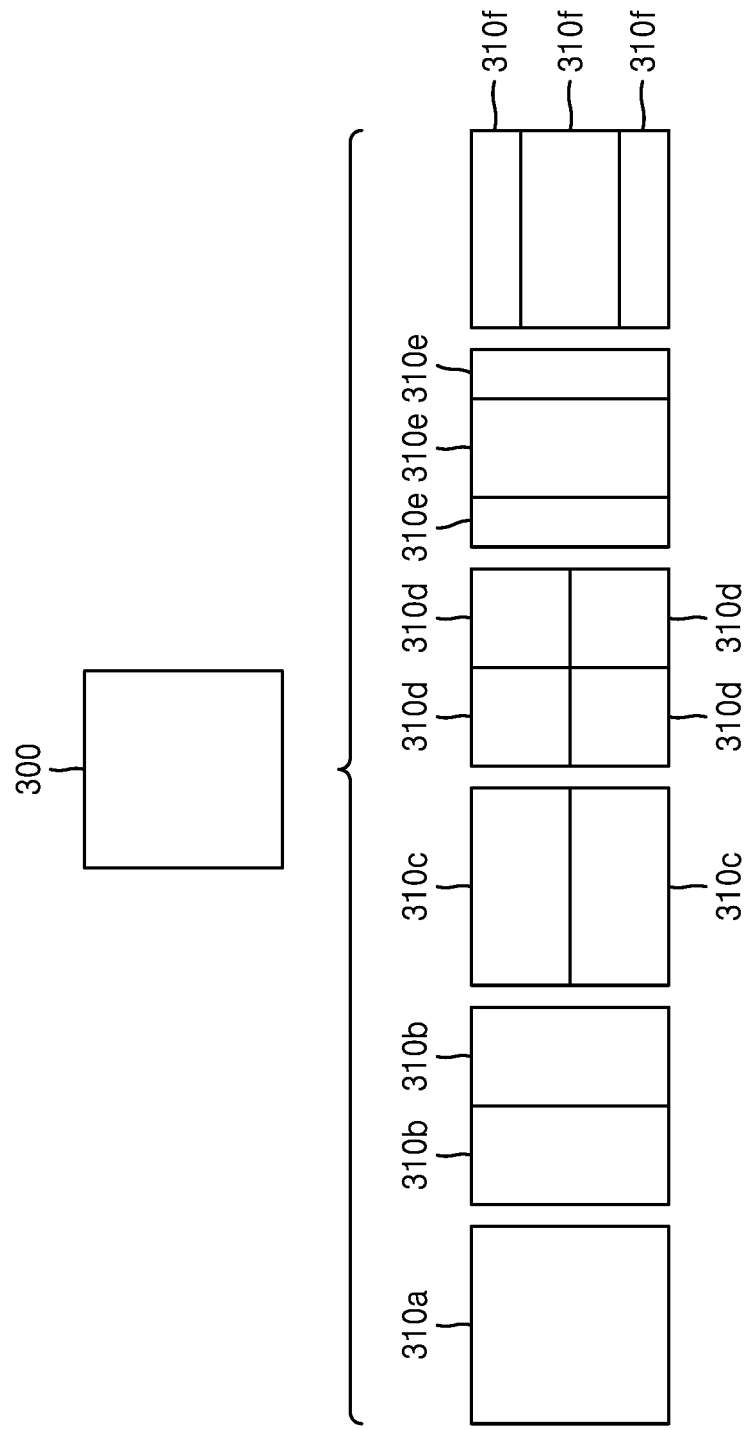
FIG. 3 illustrates a process, performed by an image decoding apparatus, of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, or a size of a coding unit.

The shape of the coding unit may include a square shape and a non-square shape. When the lengths of the width and height of the coding unit are equal (i.e., when the block shape of the coding unit is 4N×4N), the image decoding apparatus 100 may determine the block shape information of the coding unit as a square shape. The image decoding apparatus 100 may determine the shape of the coding unit as a non-square shape.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is not square, the image decoding apparatus 100 may determine the ratio of the width and height from among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 2200 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310a having the same size as the current coding unit 300 is not split, based on the split shape mode information indicating not to perform splitting, or may determine coding units 310b, 310c, 310d, 310e, or 310f split based on the split shape mode information indicating a preset splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary-splitting in a vertical direction. The image decoding apparatus 100 may determine three coding units 310f obtained by splitting the current coding unit 300 in a horizontal direction, based on the split shape mode information indicating to perform ternary-splitting in a horizontal direction. However, splitting methods of the square coding unit are not limited to the above-described methods, and the split shape mode information may indicate various methods. Preset splitting methods of splitting the square coding unit will be described in detail below in relation to various embodiments.

Figure 4:
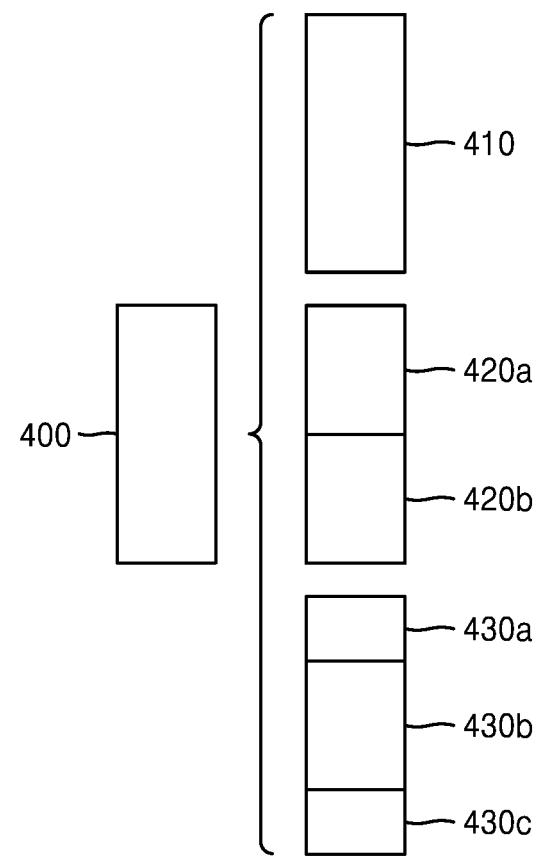
FIG. 4 illustrates a process, performed by an image decoding apparatus, of determining at least one coding unit by splitting a non-square coding unit, according to an embodiment.
Figure 4:
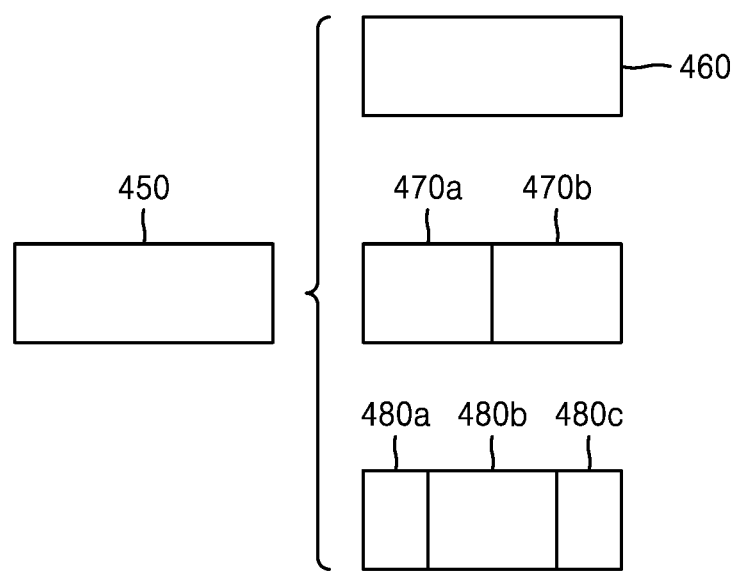

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a preset splitting method, based on split shape mode information. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating not to perform splitting, or may determine coding units 420a and 420b, 430a, 430b, and 430c, 470a and 470b, or 480a, 480b, and 480c which are split based on the split shape mode information indicating a preset splitting method. Preset splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may split a current coding unit, in consideration of the location of a long side of the non-square current coding unit 400 or 450. For example, the image decoding apparatus 100 may determine a plurality of coding units by splitting a long side of the current coding unit 400 or 450, in consideration of the shape of the current coding unit 400 or 450.

According to an embodiment, when the split shape mode information indicates to split (ternary-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may be a horizontal direction because the length of the width is longer than the length of the height. When the ratio of the width and height is 1:4, the block shape information may be a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a, 430b, and 430c by splitting the current coding unit 400 in the horizontal direction. Also, when the current coding unit 450 is in the horizontal direction, the image decoding apparatus 100 may determine the coding units 480a, 480b, and 480c by splitting the current coding unit 450 in the vertical direction.

According to an embodiment, the image decoding apparatus 100 may determine the odd number of coding units included in the current coding unit 400 or 450, and not all the determined coding units may have the same size. For example, a preset coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a preset restriction on at least one coding unit from among the odd number of coding units generated by splitting the current coding unit 400 or 450. Referring to FIG. 4, the image decoding apparatus 100 may allow a decoding process of the coding unit 430b or 480b to be different from that of the other coding units 430a and 430c, or 480a or 480c, wherein the coding unit 430b or 480b is at a center location from among the three coding units 430a, 430b, and 430c or 480a, 480b, and 480c generated by splitting the current coding unit 400 or 450. For example, the image decoding apparatus 100 may restrict the coding unit 430b or 480b at the center location to be no longer split or to be split only a preset number of times, unlike the other coding units 430a and 430c, or 480a or 480c.

Figure 5:
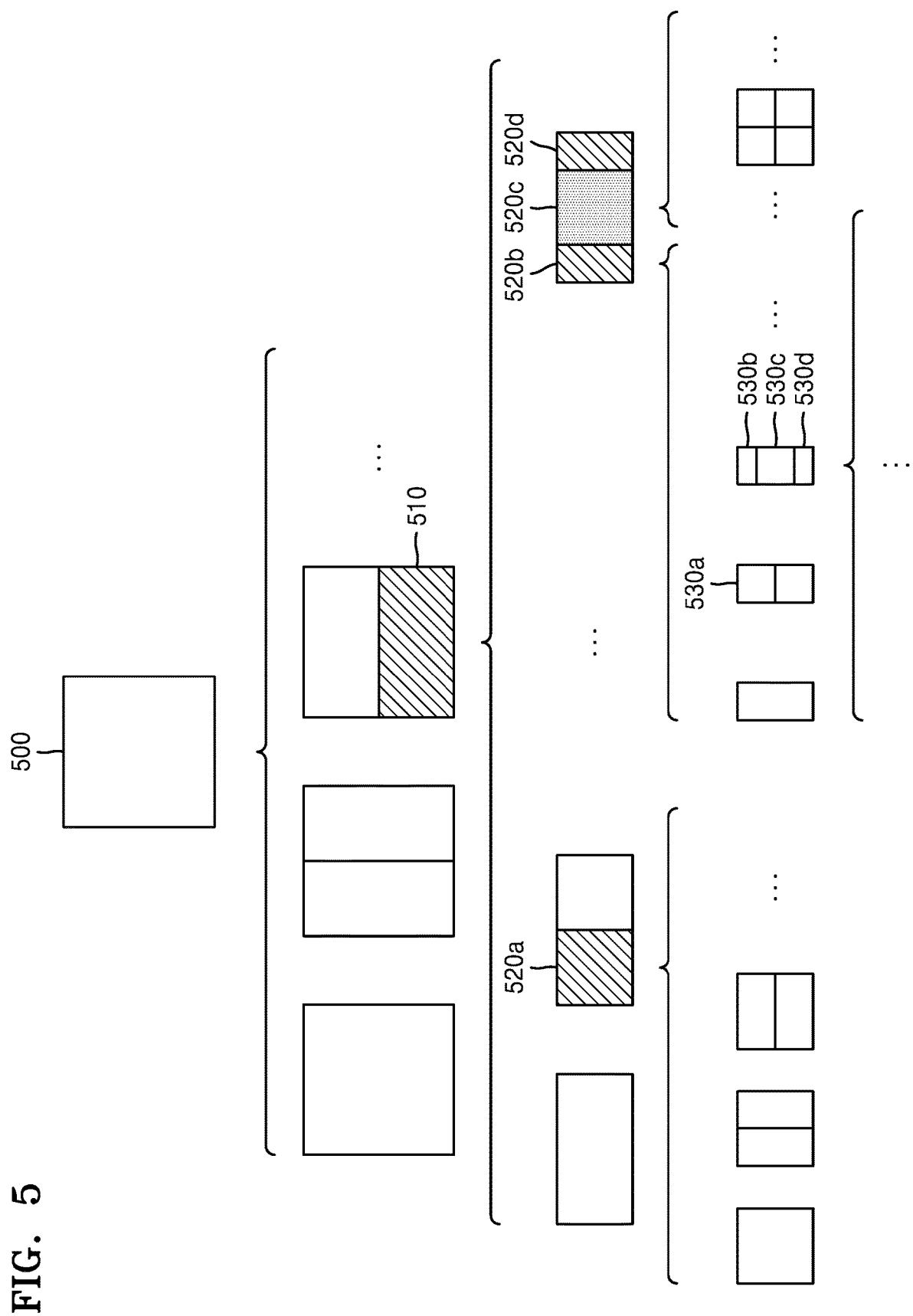
FIG. 5 illustrates a process, performed by an image decoding apparatus, of splitting a coding unit based on at least one of block shape information and split shape mode information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520a, or 520b, 520c, and 520d based on the split shape mode information, or may not split the non-square second coding unit 510. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520a, or 520b, 520c, and 520d based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a preset coding unit (e.g., a coding unit located at a center location, or a square coding unit) or a square coding unit) from among the odd number of third coding units 520b, 520c, and 520d determined by splitting the non-square second coding unit 510 may be recursively split. According to an embodiment, the square third coding unit 520c from among the odd number of third coding units 520b, 520c, and 520d may be split in a horizontal direction into a plurality of fourth coding units. A non-square fourth coding unit 530b or 530d from among a plurality of fourth coding units 530a, 530b, 530c, and 530d may be re-split into a plurality of coding units. For example, the non-square fourth coding unit 530b or 530d may be re-split into the odd number of coding units. A method that may be used to recursively split a coding unit will be described below with reference to various embodiments.

According to an embodiment, the image decoding apparatus 100 may split each of the third coding units 520a, or 520b, 520c, and 520d into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a preset restriction on a preset third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a preset splitting method (e.g., split into only four coding units or split by using a splitting method of the second coding unit 510), or to be split only a preset number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain the split shape mode information, which is used to split a current coding unit, from a preset location in the current coding unit.

Figure 6:
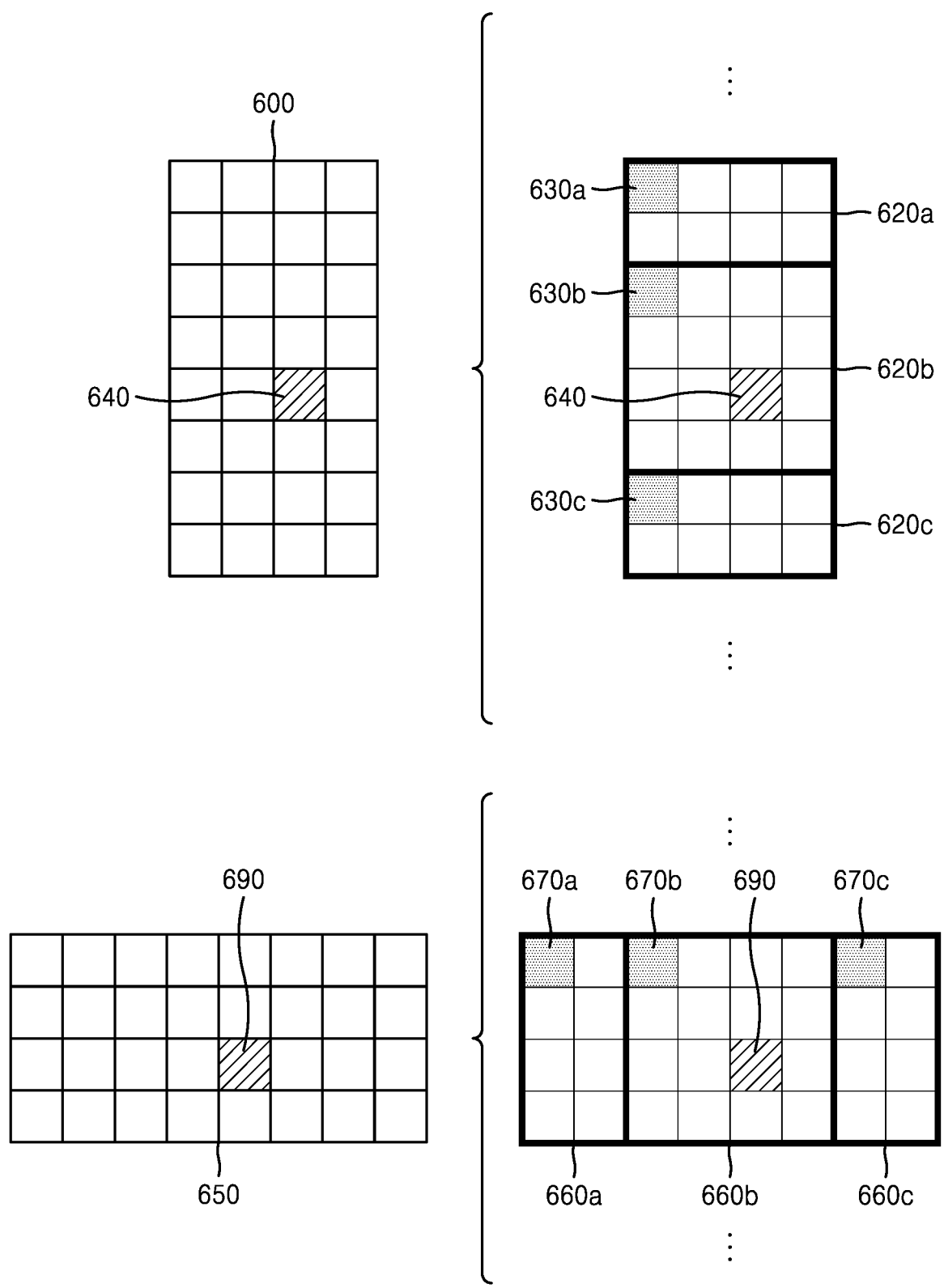
FIG. 6 illustrates a method, performed by an image decoding apparatus, of determining a preset coding unit from among an odd number of coding units, according to an embodiment.

FIG. 6 illustrates a method, performed by the image decoding apparatus 100, of determining a preset coding unit from among an odd number of coding units, according to an embodiment.

Referring to FIG. 6, split shape mode information of a current coding unit 600 or 650 may be obtained from a sample of a preset location (e.g., a sample 640 or 690 at a center location) from among a plurality of samples included in the current coding unit 600 or 650. However, the preset location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, and lower right locations). The image decoding apparatus 100 may obtain the split shape mode information from the preset location and may determine to split the current coding unit into various-shaped and various-sized coding units or may determine not to split the current coding unit.

According to an embodiment, when the current coding unit is split into a preset number of coding units, the image decoding apparatus 100 may select one of the coding units. Various methods may be used to select one of a plurality of coding units, as will be described below with reference to various embodiments.

According to an embodiment, the image decoding apparatus 100 may split the current coding unit into a plurality of coding units, and may determine a coding unit at a preset location.

According to an embodiment, image decoding apparatus 100 may use information indicating locations of the odd number of coding units so as to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of preset samples included in the coding units 620a, 620b, and 620c. In detail, the image decoding apparatus 100 may determine the coding unit 620b at the center location by determining the locations of the coding units 620a, 620b, and 620c based on information indicating locations of upper left samples 630a, 630b, and 630c of the coding units 620a, 620b, and 620c.

According to an embodiment, the information indicating the locations of the upper left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the upper left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the upper left sample 630a of the upper coding unit 620a may include coordinates (xa, ya), information indicating the location of the upper left sample 630b of the middle coding unit 620b may include coordinates (xb, yb), and information indicating the location of the upper left sample 630c of the lower coding unit 620c may include coordinates (xc, yc). The image decoding apparatus 100 may determine the middle coding unit 620b by using the coordinates of the upper left samples 630a, 630b, and 630c which are included in the coding units 620a, 620b, and 620c, respectively. For example, when the coordinates of the upper left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper left samples 630a, 630b, and 630c may include coordinates indicating absolute locations in the picture, or may use coordinates (dxb, dyb) indicating a relative location of the upper left sample 630b of the middle coding unit 620b and coordinates (dxc, dyc) indicating a relative location of the upper left sample 630c of the lower coding unit 620c with reference to the location of the upper left sample 630a of the upper coding unit 620a. A method of determining a coding unit at a preset location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a preset criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the upper left sample 630a of the upper coding unit 620a, the coordinates (xb, yb) that are the information indicating the location of the upper left sample 630b of the middle coding unit 620b, and the coordinates (xc, yc) that are the information indicating the location of the upper left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

The image decoding apparatus 100 may determine the width or height of each of the coding units 660a, 660b, and 660c by using the coordinates (xd, yd) that are information indicating the location of a upper left sample 670a of the left coding unit 660a, the coordinates (xe, ye) that are information indicating the location of a upper left sample 670b of the middle coding unit 660b, and the coordinates (xf, yf) that are information indicating a location of the upper left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a, 660b, and 660c. Referring to FIG. 6, the image decoding apparatus 100 may determine the middle coding unit 660b, which has a size different from the sizes of the left and right coding units 660a and 660c, as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a preset location from among an odd number of coding units determined by splitting the current coding unit, considering the shape of the current coding unit. For example, when the current coding unit has a non-square shape, a width of which is longer than a height, the image decoding apparatus 100 may determine the coding unit at the preset location in a horizontal direction. That is, the image decoding apparatus 100 may determine one of coding units at different locations in a horizontal direction and may put a restriction on the coding unit. When the current coding unit has a non-square shape, a height of which is longer than a width, the image decoding apparatus 100 may determine the coding unit at the preset location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the predetermined location from among the even number of coding units. The image decoding apparatus 100 may determine an even number of coding units by splitting (binary-splitting) the current coding unit, and may determine the coding unit at the preset location by using the information about the locations of the even number of coding units. An operation related thereto may correspond to the operation of determining a coding unit at a preset location (e.g., a center location) from among an odd number of coding units, which has been described in detail above with reference to FIG. 6, and thus detailed descriptions thereof are not provided here.

According to an embodiment, when a non-square current coding unit is split into a plurality of coding units, preset information about a coding unit at a preset location may be used in a splitting operation to determine the coding unit at the preset location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used in a process of determining the coding unit at the center location.

According to an embodiment, preset information for identifying the coding unit at the preset location may be obtained from a preset sample included in a coding unit to be determined. Referring to FIG. 6, the image decoding apparatus 100 may use the split shape mode information, which is obtained from a sample at a preset location in the current coding unit 600 (e.g., a sample at a center location of the current coding unit 600) to determine a coding unit at a preset location from among the plurality of the coding units 620a, 620b, and 620c determined by splitting the current coding unit 600 (e.g., a coding unit at a center location from among a plurality of split coding units). That is, the image decoding apparatus 100 may determine the sample at the preset location by considering a block shape of the current coding unit 600, may determine the coding unit 620b including a sample, from which preset information (e.g., the split shape mode information) is obtainable, from among the plurality of coding units 620a, 620b, and 620c determined by splitting the current coding unit 600, and may put a preset restriction on the coding unit 620b. Referring to FIG. 6, according to an embodiment, the image decoding apparatus 100 may determine the sample 640 at the center location of the current coding unit 600 as the sample from which the preset information is obtainable, and may put a preset restriction on the coding unit 620b including the sample 640, in a decoding operation. However, the location of the sample from which the preset information is obtainable is not limited to the above-described location, and may include arbitrary locations of samples included in the coding unit 620b to be determined for a restriction.

According to an embodiment, the location of the sample from which the preset information is obtainable may be determined based on the shape of the current coding unit 600. According to an embodiment, the block shape information may indicate whether the current coding unit has a square or non-square shape, and the location of the sample from which the preset information is obtainable may be determined based on the shape. For example, the image decoding apparatus 100 may determine a sample located on a boundary for splitting at least one of a width and height of the current coding unit in half, as the sample from which the preset information is obtainable, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the preset information is obtainable.

According to an embodiment, when the current coding unit is split into a plurality of coding units, the image decoding apparatus 100 may use the split shape mode information to determine a coding unit at a preset location from among the plurality of coding units. According to an embodiment, the image decoding apparatus 100 may obtain the split shape mode information from a sample at a preset location in a coding unit, and may split the plurality of coding units, which are generated by splitting the current coding unit, by using the split shape mode information, which is obtained from the sample of the preset location in each of the plurality of coding units. That is, a coding unit may be recursively split based on the split shape mode information, which is obtained from the sample at the preset location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a preset block (e.g., the current coding unit).

Figure 7:
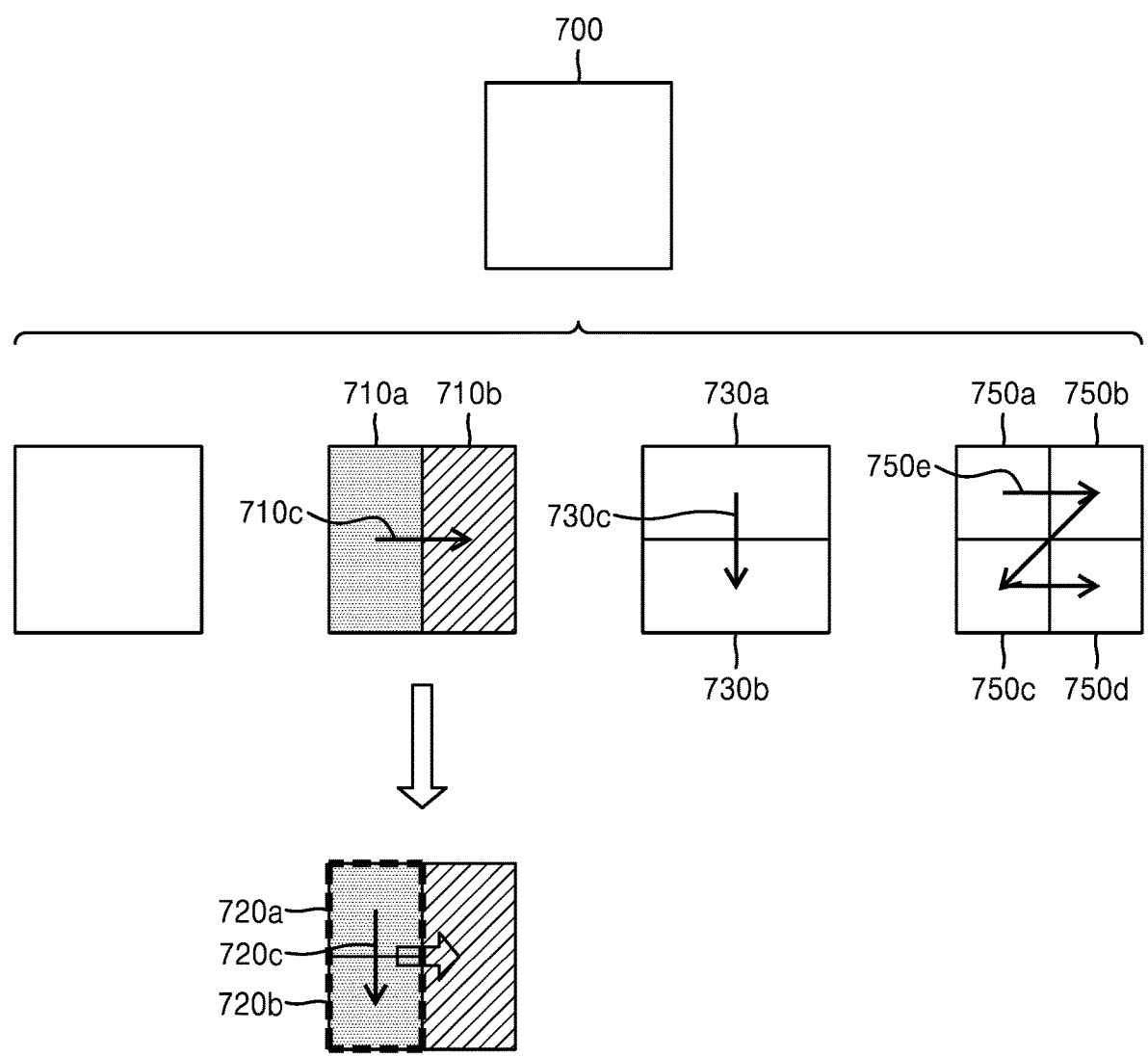
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a to 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine to process the second coding units 750a to 750d, which are determined by splitting the first coding unit 700 in vertical and horizontal directions, according to a preset order (e.g., a raster scan order or Z-scan order 750e) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710a and 710b, 730a and 730b, or 750a, 750b, 750c, and 750d by splitting the first coding unit 700, and may recursively split each of the determined plurality of coding units 710a and 710b, 730a and 730b, or 750a, 750b, 750c, and 750d. A splitting method of the plurality of coding units 710a and 710b, 730a and 730b, or 750a, 750b, 750c, and 750d may correspond to a splitting method of the first coding unit 700. As such, each of the plurality of coding units 710a and 710b, 730a and 730b, or 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a preset order.

Figure 8:
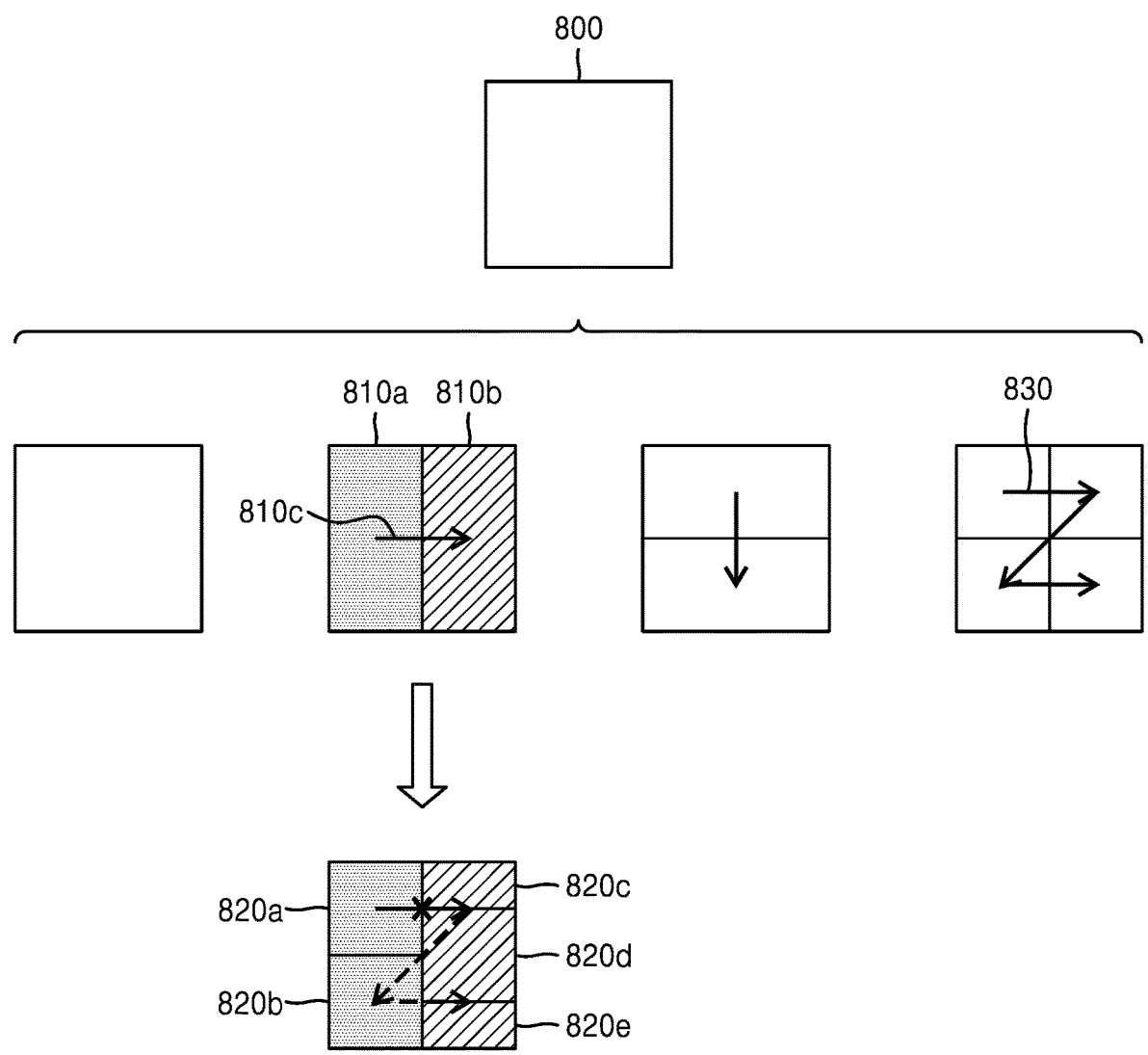
FIG. 8 illustrates a process, performed by an image decoding apparatus, of determining that a current coding unit is to be split into an odd number of coding units, when the coding units are not processable in a preset order, according to an embodiment.

FIG. 8 illustrates a process, performed by the image decoding apparatus 100, of determining that a current coding unit is to be split into an odd number of coding units, when the coding units are not processable in a preset order, according to an embodiment.

According to an embodiment, the image decoding apparatus 100 may determine that the current coding unit is to be split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c, 820d, and 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c, 820d, and 820e.

According to an embodiment, the image decoding apparatus 100 may determine whether any coding unit that is split into an odd number of coding units exists, by determining whether the third coding units 820a and 820b, and 820c, 820d, and 820e are processable in a preset order. Referring to FIG. 8, the image decoding apparatus 100 may determine the third coding units 820a and 820b, and 820c, 820d, and 820e by recursively splitting the first coding unit 800. The image decoding apparatus 100 may determine whether any of the first coding unit 800, the second coding units 810a and 810b, and the third coding units 820a and 820b, and 820c, 820d, and 820e are to be split into an odd number of coding units, based on at least one of the block shape information and the split shape mode information. For example, the second coding unit 810b located in the right from among the second coding units 810a and 810b may be split into an odd number of third coding units 820c, 820d, and 820e. A processing order of a plurality of coding units included in the first coding unit 800 may be a preset order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the preset order.

According to an embodiment, the image decoding apparatus 100 may determine whether the third coding units 820a and 820b, and 820c, 820d, and 820e included in the first coding unit 800 satisfy the condition for processing in the preset order, and the condition relates to whether at least one of a width and height of the second coding units 810a and 810b is to be split in half along a boundary of the third coding units 820a and 820b, and 820c, 820d, and 820e. For example, the third coding units 820a and 820b determined when the height of the left second coding unit 810a of the non-square shape is split in half may satisfy the condition. It may be determined that the third coding units 820c to 820e do not satisfy the condition because the boundaries of the third coding units 820c to 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is to be split into an odd number of coding units, based on a result of the determination. According to an embodiment, when a coding unit is split into an odd number of coding units, the image decoding apparatus 100 may put a preset restriction on a coding unit at a preset location from among the split coding units. The restriction or the preset location has been described above in relation to various embodiments, and thus detailed descriptions thereof will not be provided herein.

Figure 9:
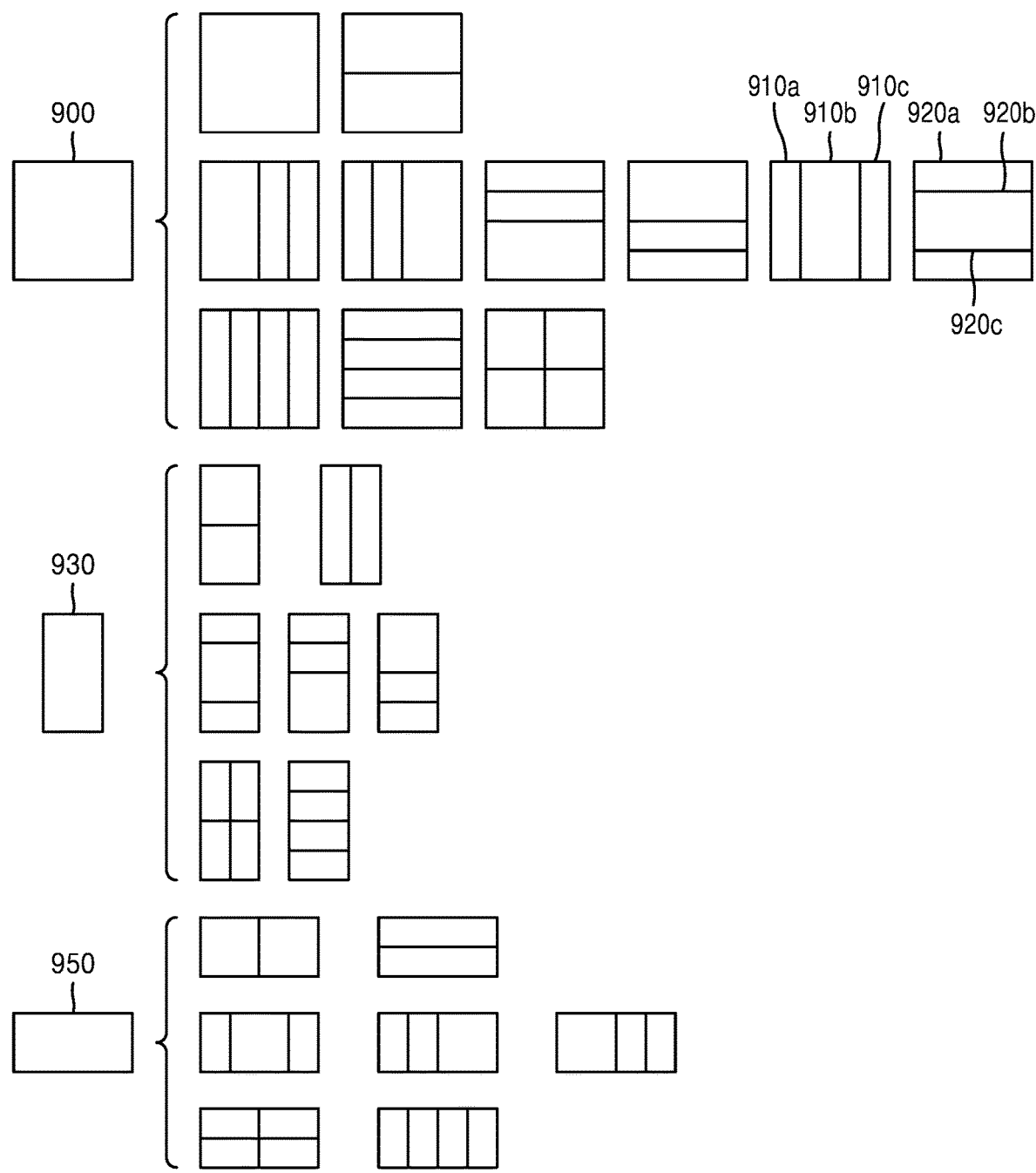
FIG. 9 illustrates a process, performed by an image decoding apparatus, of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on split shape mode information which is obtained through the receiver 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a preset order, and the condition relates to whether at least one of a width and height of the first coding unit 900 is to be split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the preset order. In addition, because boundaries of the second coding units 920a, 920b, and 920c determined by splitting the square first coding unit 900 in a horizontal direction do not split the width of the first coding unit 900 in half, it may be determined that the first coding unit 900 does not satisfy the condition for processing in the preset order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a preset restriction on a coding unit at a preset location from among the split coding units. The restriction or the preset location has been described above with reference to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
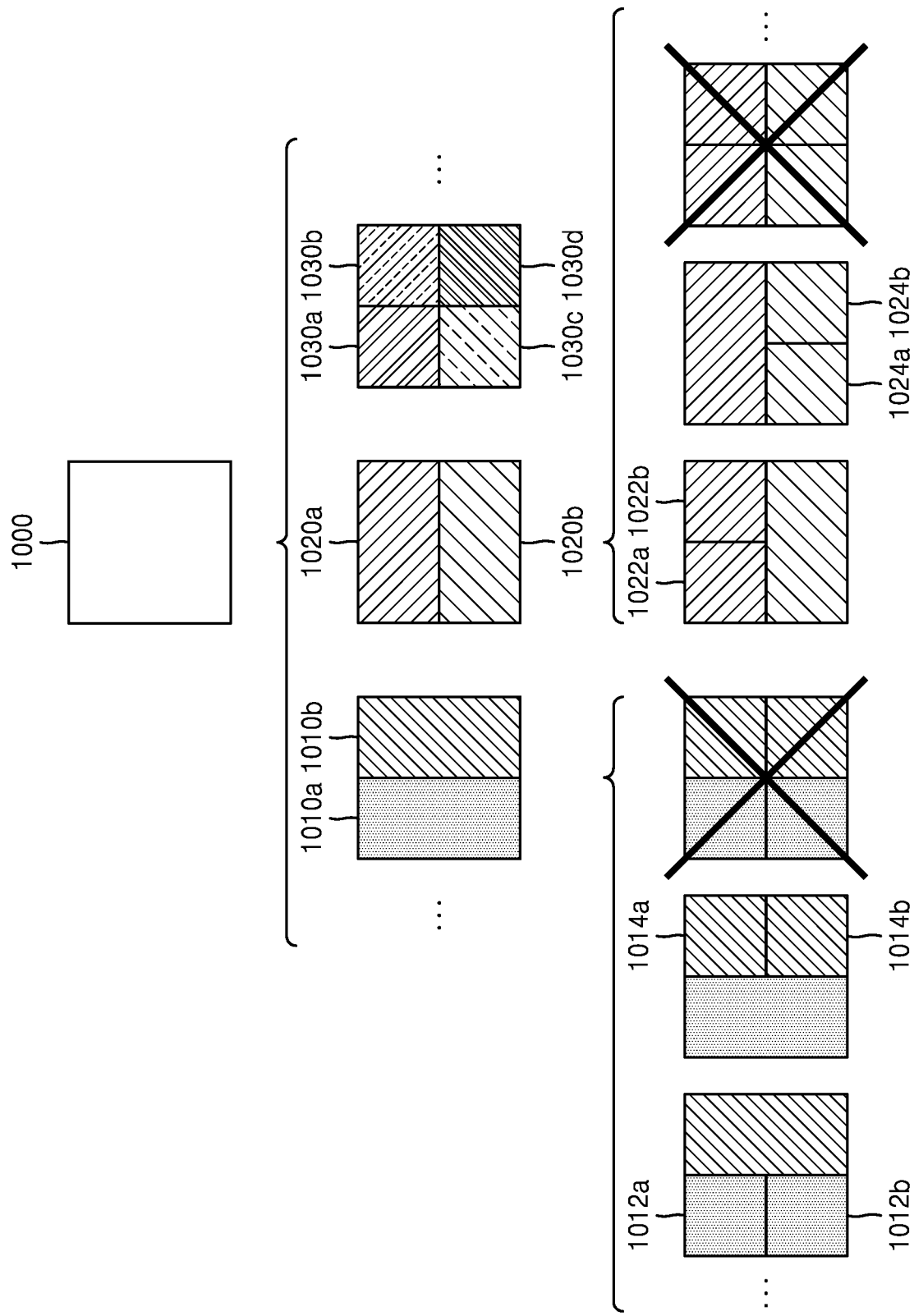
FIG. 10 illustrates that a shape into which a second coding unit is splittable is restricted when the second coding unit having a non-square shape, which is determined when an image decoding apparatus splits a first coding unit, satisfies a preset condition, according to an embodiment.

FIG. 10 illustrates that a shape into which a second coding unit is splittable is restricted when the second coding unit having a non-square shape, which is determined as the image decoding apparatus 100 splits a first coding unit 1000, satisfies a preset condition, according to an embodiment.

According to an embodiment, the image decoding apparatus 100 may determine to split the square first coding unit 1000 into non-square second coding units 1010a and 1010b or 1020a and 1020b, based on split shape mode information, which is obtained by the receiver 110. The second coding units 1010a and 1010b or 1020a and 1020b may be independently split. Accordingly, the image decoding apparatus 100 may determine to split or not to split each of the second coding units 1010a and 1010b or 1020a and 1020b into a plurality of coding units, based on the split shape mode information of each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
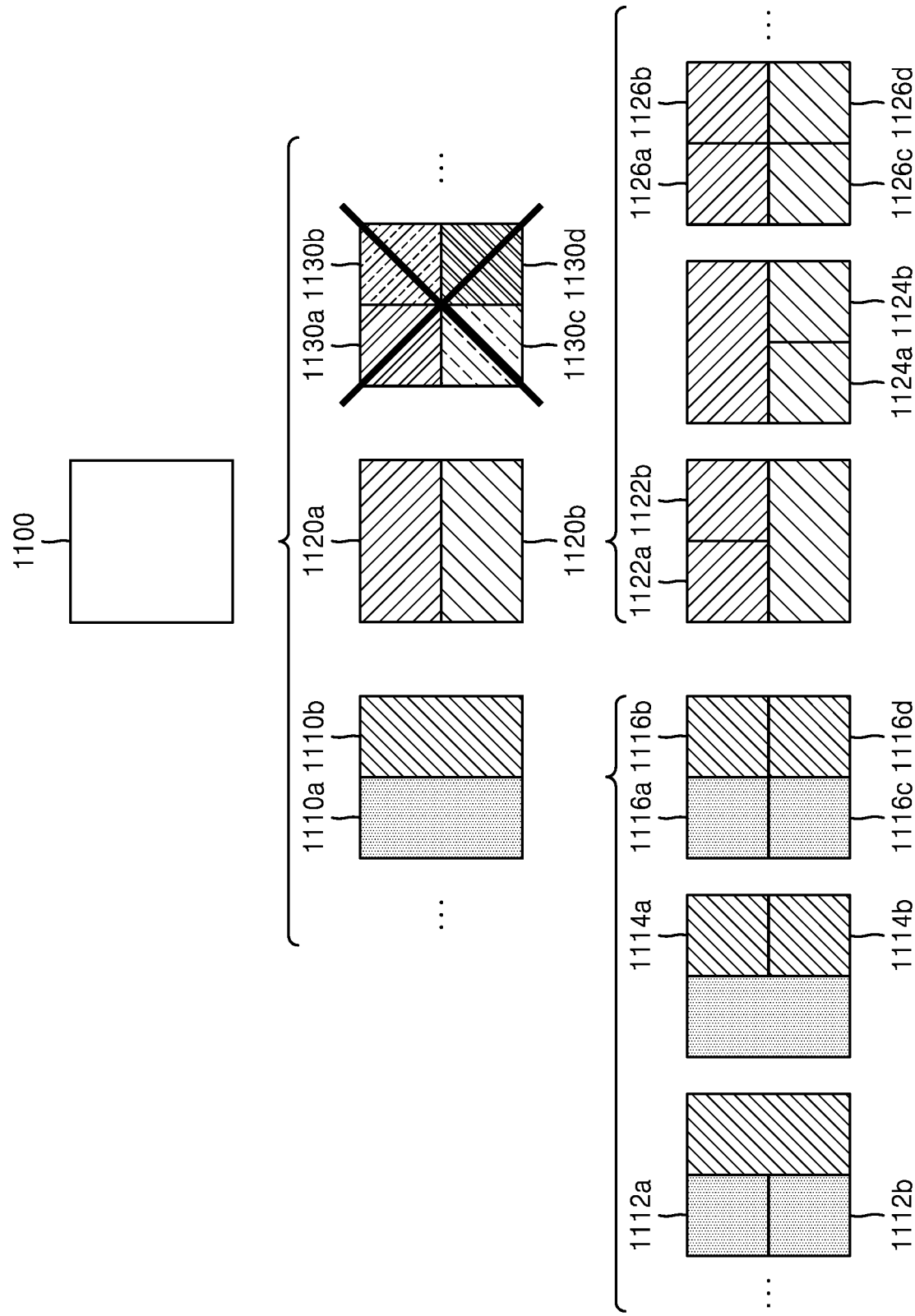
FIG. 11 illustrates a process, performed by an image decoding apparatus, of splitting a square coding unit when split shape mode information is unable to indicate that the square coding unit is to be split into four square coding units, according to an embodiment.

FIG. 11 illustrates a process, performed by the image decoding apparatus 100, of splitting a square coding unit when split shape mode information is unable to indicate that the square coding unit is split into four square coding units, according to an embodiment.

According to an embodiment, the image decoding apparatus 100 may determine second coding units 1110a and 1110b or 1120a and 1120b, etc. by splitting a first coding unit 1100, based on split shape mode information. The split shape mode information may include information about various shapes in which a coding unit is splittable but, the information about various shapes may not include information for splitting the coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b or 1120a and 1120b, etc., based on the split shape mode information.

According to an embodiment, the image decoding apparatus 100 may independently split the non-square second coding units 1110a and 1110b or 1120a and 1120b, etc. Each of the second coding units 1110a and 1110b or 1120a and 1120b, etc. may be recursively split in a preset order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130*a*, 1130*b*, 1130*c*, and 1130*d* split from the first coding unit 1100 may be determined.

Figure 12:
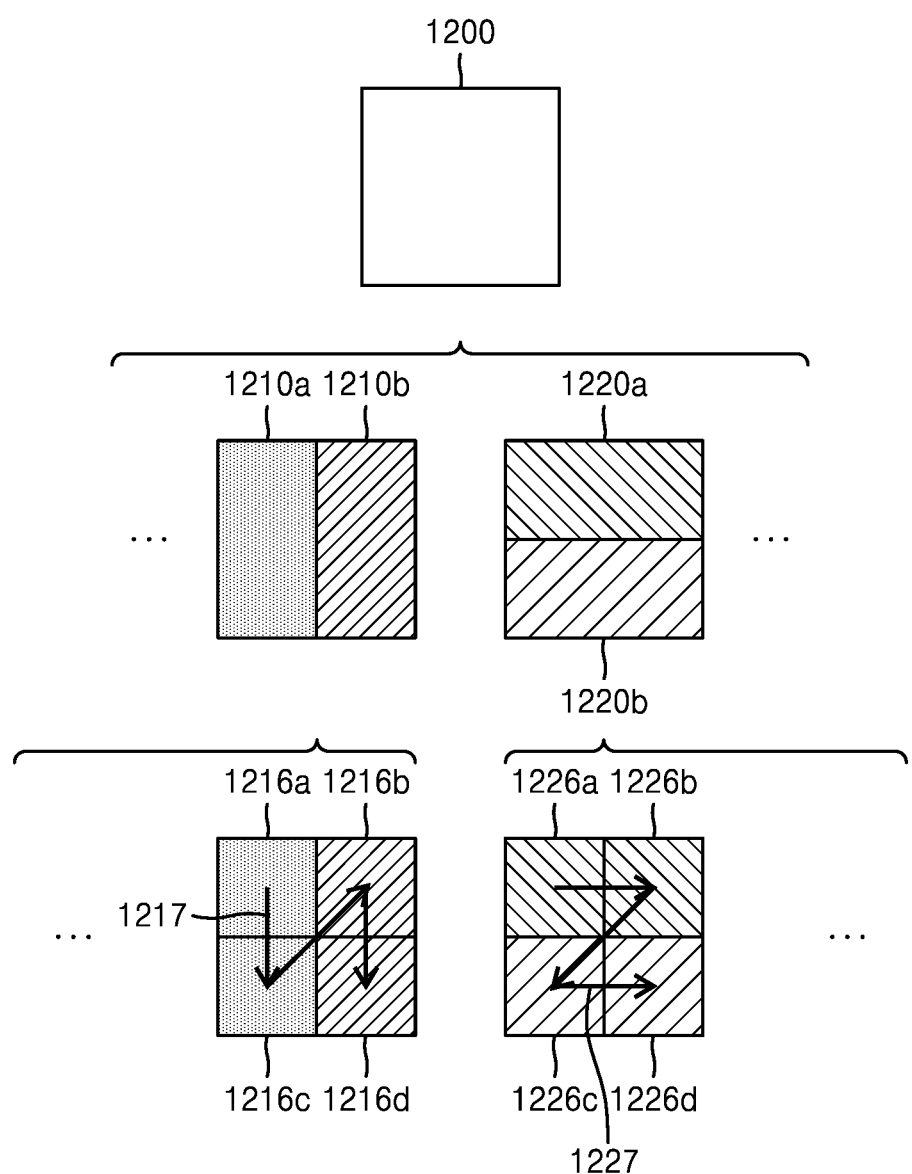
FIG. 12 illustrates that a processing order between a plurality of coding units may be changed depending on a process of splitting a coding unit, according to an embodiment.

FIG. 12 illustrates that a processing order of a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210*a* and 1210*b* or 1220*a* and 1220*b*, etc. by splitting the first coding unit 1200. Referring to FIG. 12, the non-square second coding units 1210*a* and 1210*b* or 1220*a* and 1220*b* determined by splitting the first coding unit 1200 in only a horizontal direction or vertical direction may be independently split based on the split shape mode information of each coding unit. For example, the image decoding apparatus 100 may determine third coding units 1216*a*, 1216*b*, 1216*c*, and 1216*d* by splitting the second coding units 1210*a* and 1210*b*, which are generated by splitting the first coding unit 1200 in a vertical direction, in a horizontal direction, and may determine third coding units 1226*a*, 1226*b*, 1226*c*, and 1226*d* by splitting the second coding units 1220*a* and 1220*b*, which are generated by splitting the first coding unit 1200 in a horizontal direction, in a horizontal direction. An operation of splitting the second coding units 1210*a* and 1210*b* or 1220*a* and 1220*b* has been described above in relation to FIG. 11, and thus detailed descriptions thereof will not be provided herein.

According to an embodiment, the image decoding apparatus 100 may process coding units in a preset order. An operation of processing coding units in a preset order has been described above in relation to FIG. 7, and thus detailed descriptions thereof will not be provided herein. Referring to FIG. 12, the image decoding apparatus 100 may determine four square third coding units 1216*a*, 1216*b*, 1216*c*, and 1216*d*, and 1226*a*, 1226*b*, 1226*c*, and 1226*d* by splitting the square first coding unit 1200. According to an embodiment, the image decoding apparatus 100 may determine processing orders of the third coding units 1216*a*, 1216*b*, 1216*c*, and 1216*d*, and 1226*a*, 1226*b*, 1226*c*, and 1226*d* based on a splitting method of the first coding unit 1200.

According to an embodiment, the image decoding apparatus 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a* and 1210*b*, and 1220*a* and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. Accordingly, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a preset criterion. For example, the preset criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
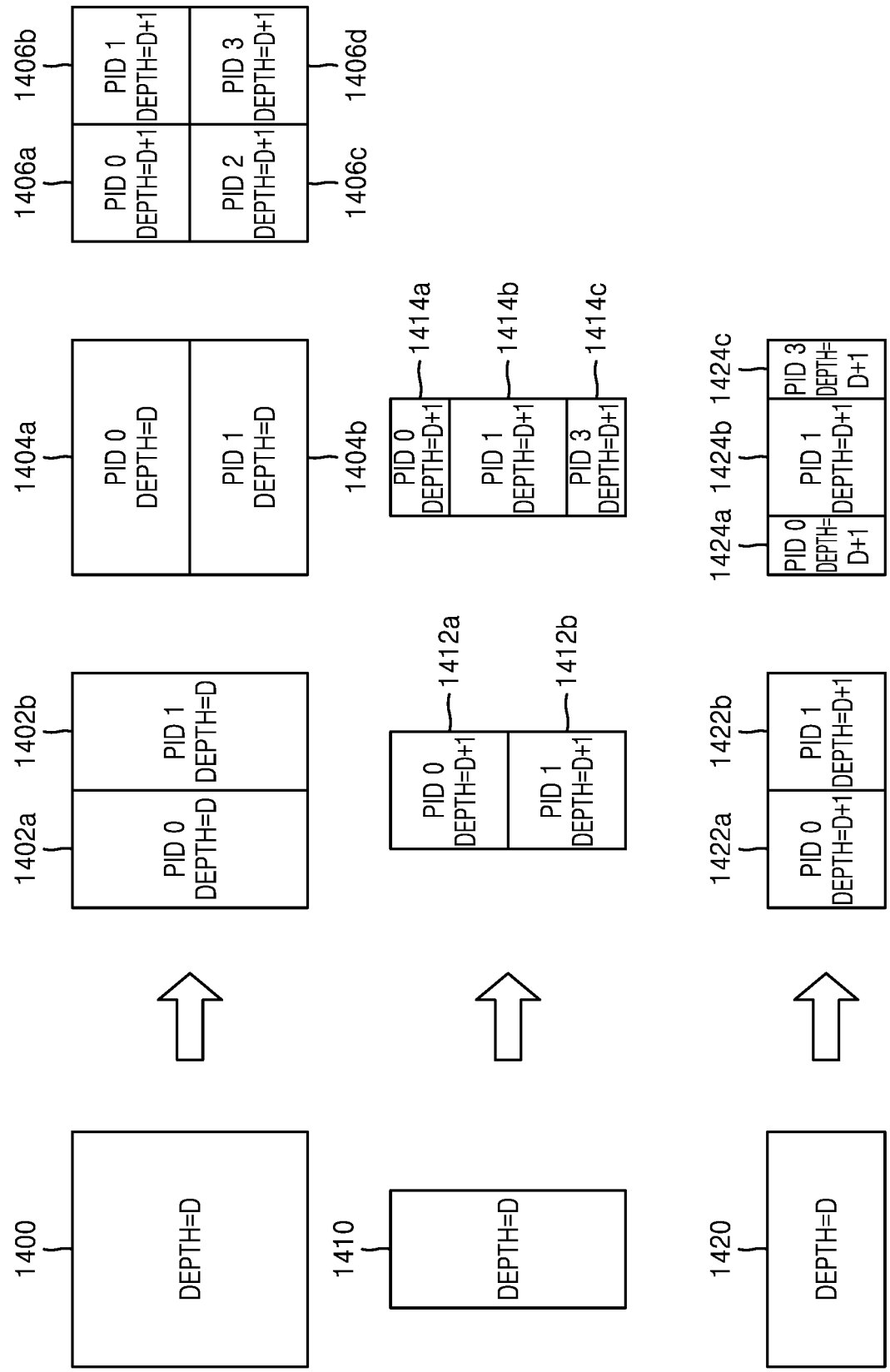
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, depths of the second coding units 1402a and 1402b, 1404a and 1404b, and 1406a, 1406b, 1406c, and 1406d that are determined based on the split shape mode information of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 2100 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, and 1414a, 1414b, and 1414c, or 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414*a*, 1414*b*, and 1414*c* based on the split shape mode information. The odd number of second coding units 1414*a*, 1414*b*, and 1414*c* may include the non-square second coding units 1414*a* and 1414*c* and the square second coding unit 1414*b*. In this case, because the length of a long side of the non-square second coding units 1414*a* and 1414*c* and the length of a side of the square second coding unit 1414*b* are ½ times the length of a long side of the first coding unit 1410, a depth of the second coding units 1414*a*, 1414*b*, and 1414*c* may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414*b* of a center location from among an odd number of split coding units 1414*a*, 1414*b*, and 1414*c* may have a width equal to that of the other coding units 1414*a* and 1414*c* and a height which is two times that of the other coding units 1414*a* and 1414*c*. That is, in this case, the coding unit 1414*b* at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample of a preset location of each coding unit (e.g., an upper left sample).

According to an embodiment, the image decoding apparatus 100 may determine a coding unit at a preset location from among the split coding units, by using the PIDs for distinguishing between the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units so as to determine a coding unit at a center location from among the coding units. The image decoding apparatus 100 may determine the coding unit 1414*b* having a PID corresponding to a middle value from among the PIDs of the coding units, as the coding unit at the center location from among the coding units determined by splitting the first coding unit 1410. According to an embodiment, the image decoding apparatus 100 may determine PIDs for distinguishing between split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a preset location from among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the preset location are not limited to the above-described examples, and various PIDs and various locations and sizes of coding units may be used.

According to an embodiment, the image decoding apparatus 100 may use a preset data unit where a coding unit starts to be recursively split.

Figure 15:
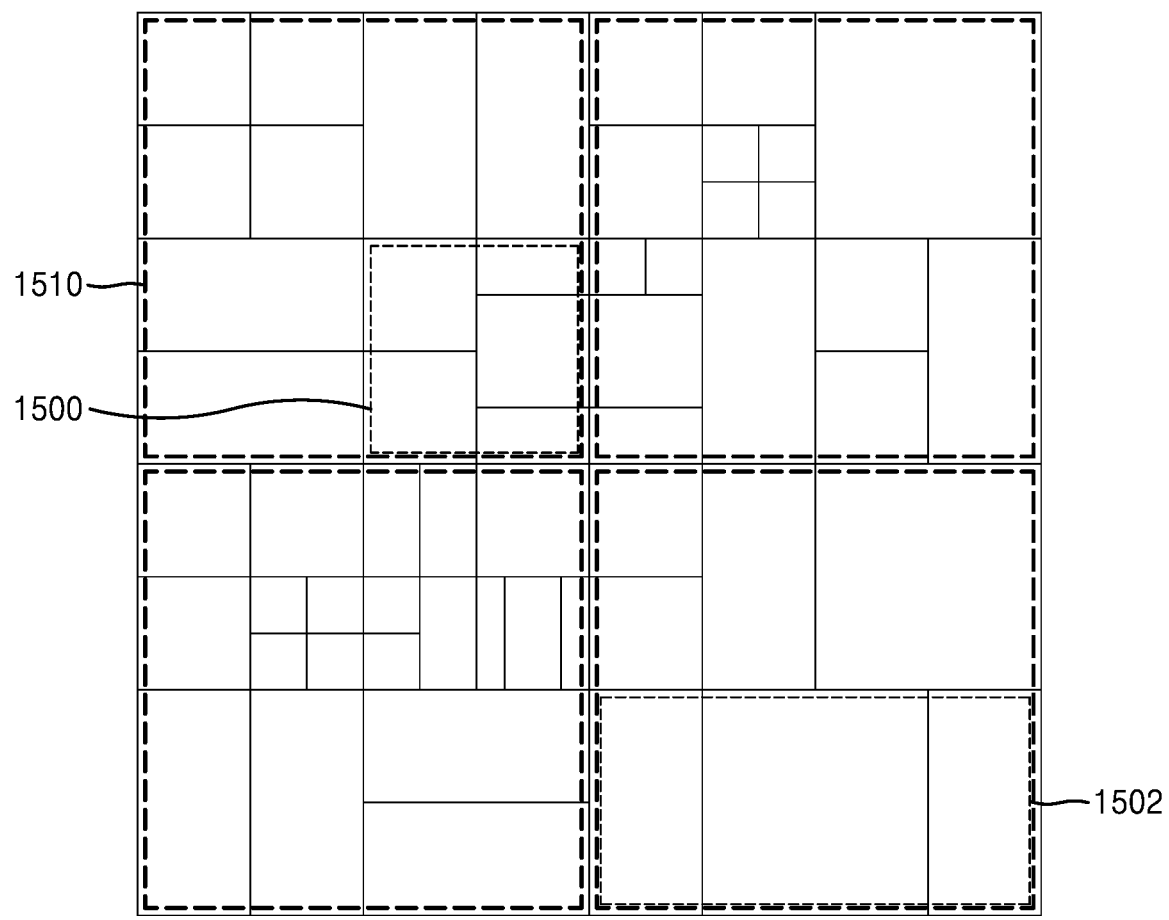
FIG. 15 illustrates that a plurality of coding units are determined based on a plurality of preset data units included in a picture, according to an embodiment.

FIG. 15 illustrates that a plurality of coding units are determined based on a plurality of preset data units included in a picture, according to an embodiment.

According to an embodiment, a preset data unit may be defined as a data unit where a coding unit starts to be recursively split by using split shape mode information. That is, the preset data unit may correspond to a coding unit of an uppermost depth, which is used to determine a plurality of coding units split from a current picture. In the following descriptions, for convenience of explanation, the preset data unit is referred to as a reference data unit.

According to an embodiment, the reference data unit may have a preset size and shape. According to an embodiment, the reference data unit may include M×N samples. Herein, M and N may be equal to each other, and may be integers expressed as powers of 2. That is, the reference data unit may have a square or non-square shape, and may be split into an integer number of coding units at a later time.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above with reference to the operation of splitting the current coding unit 300 of FIG. 3, and an operation of splitting the non-square reference coding unit 1502 into one or more coding units has been described above with reference to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a preset condition. That is, the receiver 110 may obtain, from the bitstream, only the PID for identifying the size and shape of reference coding units with respect to each slice, each slice segment, each tile, each tile group, or largest coding unit which is a data unit satisfying a preset condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the preset condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
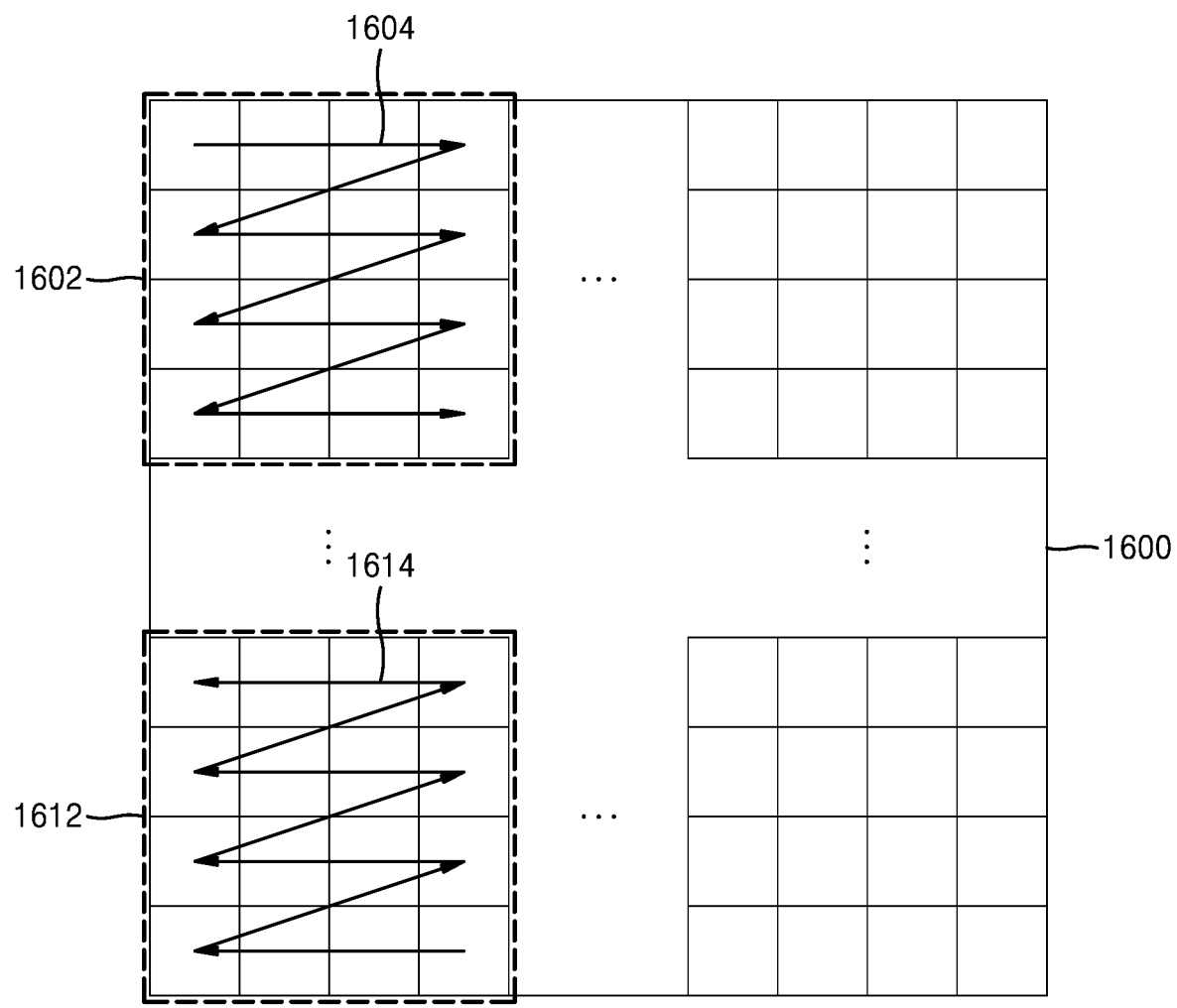
FIG. 16 illustrates a processing block serving as a unit for determining a determination order of reference coding units included in a picture, according to an embodiment.

FIG. 16 illustrates a processing block serving as a criterion for determining a determination order of reference coding units included in a picture 1600, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a preset size of data units, which is indicated by the processing block size information.

According to an embodiment, the receiver 110 of the image decoding apparatus 100 may obtain the processing block size information from the bitstream according to each specific data unit. For example, the processing block size information may be obtained from the bitstream in a data unit such as an image, sequence, picture, slice, slice segment, tile, tile group, or the like. That is, the receiver 110 may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the receiver 110 may obtain the determination order information of reference coding units from the bitstream according to each data unit such as an image, sequence, picture, slice, slice segment, tile, tile group, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on a determination order determined according to an embodiment.

According to an embodiment, the receiver 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain, from the bitstream, block shape information indicating the shape of a current coding unit or split shape mode information indicating a splitting method of the current coding unit, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule according to an embodiment of the disclosure will be described in detail.

The image decoding apparatus 100 may determine a split rule of an image. The split rule may be pre-determined between the image decoding apparatus 100 and the image encoding apparatus 2200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, and a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image encoding apparatus 2200 and the image decoding apparatus 100 may pre-determine to determine the split rule based on the block shape of the coding unit. However, an embodiment is not limited thereto. The image decoding apparatus 100 may determine the split rule based on the information obtained from the bitstream received from the image encoding apparatus 2200.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32 or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule pre-determined between the image encoding apparatus 2200 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders have been described above with reference to FIG. 12, details thereof are not provided again.

Hereinafter, according to an embodiment provided in the present specification, a method and apparatus for encoding or decoding a video will now be described with reference to FIGS. 17 to 20, the method including determining whether to add a motion vector to a motion vector candidate list of a current block (that is, determining whether the motion vector is insufficient), when it is determined to add the motion vector, determining a base motion vector in the motion vector candidate list, determining the motion vector candidate list including an additional motion vector candidate determined based on the base motion vector and predetermined offset information, and determining a motion vector of the current block by using the additional motion vector candidate determined in the motion vector candidate list.

Figure 17:
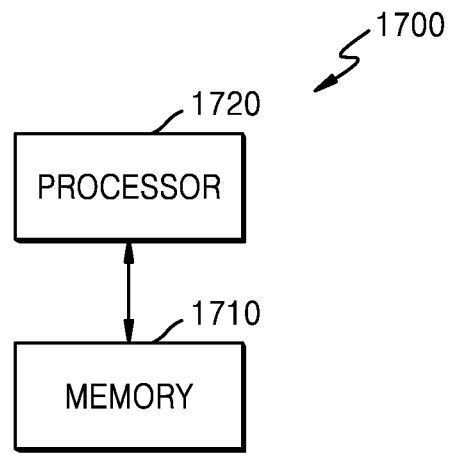
FIG. 17 illustrates a block diagram of a video decoding apparatus 1700 according to an embodiment.

FIG. 17 illustrates a block diagram of a video decoding apparatus 1700 according to an embodiment.

The video decoding apparatus 1700 according to an embodiment may include a memory 1710 and at least one processor 1720 connected to the memory 1710. Operations of the video decoding apparatus 1700 according to an embodiment may operate as individual processors or by the control of a central processor. Also, the memory 1710 of the video decoding apparatus 1700 may store data received from an outer source and data generated by the processor 1720, for example, information about whether to add a motion vector to a motion vector candidate list of a current block, information about a base motion vector, or the like.

The processor 1720 of the video decoding apparatus 1700 may determine whether to add a motion vector to a motion vector candidate list of a current block, when it is determined to add the motion vector to the motion vector candidate list, may determine a base motion vector in the motion vector candidate list, may determine the motion vector candidate list including an additional motion vector candidate determined based on the base motion vector and predetermined offset information, and may determine a motion vector of the current block by using the additional motion vector candidate determined in the motion vector candidate list.

Hereinafter, with reference to FIG. 18, operations of a video decoding method, performed by the video decoding apparatus 1700, will now be described, the operations including determining whether to add a motion vector to a motion vector candidate list of a current block, when it is determined to add the motion vector to the motion vector candidate list, determining a base motion vector in the motion vector candidate list, determining the motion vector candidate list including an additional motion vector candidate determined based on the base motion vector and predetermined offset information, and determining a motion vector of the current block by using the additional motion vector candidate determined in the motion vector candidate list.

Figure 18:
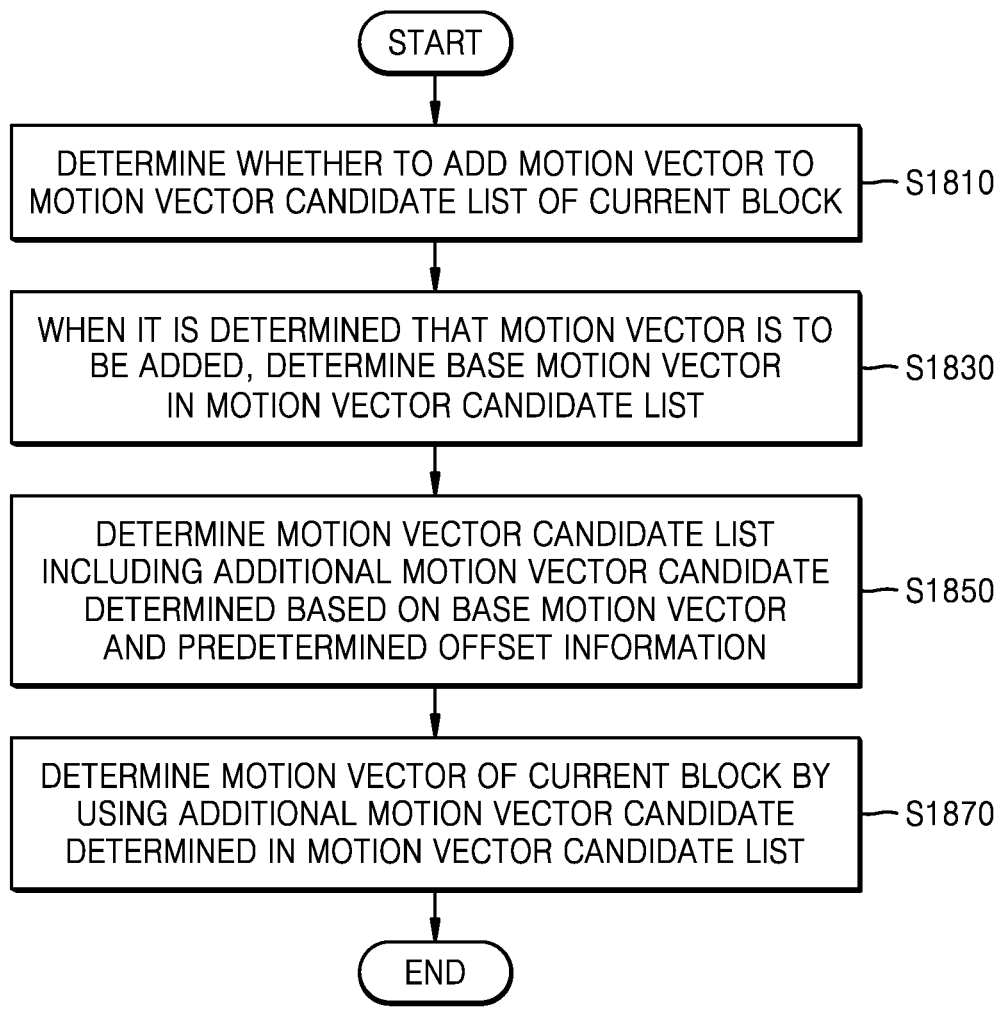
FIG. 18 illustrates a flowchart of a video decoding method according to an embodiment.

FIG. 18 illustrates a flowchart of a video decoding method according to an embodiment.

Referring to FIG. 18, in operation S1810, the video decoding apparatus 1700 may determine whether to add a motion vector to a motion vector candidate list of a current block.

According to an embodiment, in a case where the number of motion vector candidates included in the motion vector candidate list of the current block is insufficient compared to the maximum number of motion vectors of the motion vector candidate list, and thus it is determined that a motion vector is to be added to the motion vector candidate list of the current block, an additional motion vector may be determined based on predetermined offset information and a base motion vector that is determined from among motion vectors included in the motion vector candidate list.

According to an embodiment, whether to add a motion vector to the motion vector candidate list of the current block may be determined that a motion vector is to be added to the motion vector candidate list, when a zero motion vector is included in the motion vector candidate list in a motion vector deriving method according to the related art. That is, whether to add a motion vector to a current motion vector candidate list may be determined that a motion vector is to be added to the motion vector candidate list, when a motion vector is insufficient in the current motion vector candidate list and thus a zero motion vector is included therein.

According to an embodiment, whether to add a motion vector to the motion vector candidate list of the current block may be determined by obtaining a flag.

According to an embodiment, a prediction mode of the current block may be one of a skip mode, a merge mode, and an inter mode.

According to an embodiment, the prediction mode of the current block may be one of a skip affine mode, a merge affine mode, and an inter affine mode, and in this case, a motion vector, a base motion vector, and an additional motion vector candidate of the motion vector candidate list may be affine-transformed motion vectors. Also, the affine-transformed motion vectors may be 4 affine parameters or 6 affine parameters.

According to an embodiment, the predetermined offset information may be a predetermined arbitrary offset value such as 0, 1, 2, 4, 8, −1, −2, −4, −8, and the like.

According to an embodiment, the predetermined offset information may be a value obtained from signaled information.

According to an embodiment, the predetermined offset information may be a value determined by signaling an index corresponding to an offset value stored in a predetermined table.

Referring back to FIG. 18, when it is determined that the motion vector is to be added, in operation S1830, a base motion vector may be determined in the motion vector candidate list.

According to an embodiment, the base motion vector may be selected from among motion vectors of adjacent blocks neighboring the current block.

According to an embodiment, a plurality of motion vectors may be selected as the base motion vector.

According to an embodiment, in a bi-directional prediction, the base motion vector may include motion vectors of a reference list L0 and a reference list L1.

According to an embodiment, in a uni-directional prediction, the base motion vector may include one motion vector.

According to an embodiment, the base motion vector may include a motion vector that is not selected in a process of configuring the motion vector candidate list.

Referring back to FIG. 18, in operation S1850, the motion vector candidate list including an additional motion vector candidate determined based on the base motion vector and predetermined offset information may be determined.

In operation S1870, a motion vector of the current block may be determined by using the additional motion vector candidate determined in the motion vector candidate list.

Figure 21:
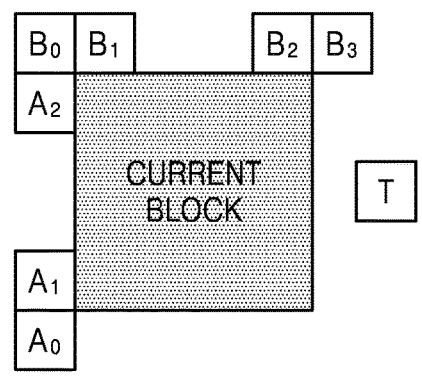
FIG. 21 illustrates an example of a current block and spatial or temporal adjacent blocks that neighbor the current block.

FIG. 21 illustrates an example of a current block and spatial or temporal adjacent blocks that neighbor the current block.

Referring to FIG. 21, the temporal adjacent blocks neighboring the current block may be A0 and A1 located in a lower left side of the current block, may be A2, B0, and B1 located in an upper left side of the current block, and may be B2 and B3 located in an upper right side of the current block, and the temporal adjacent block neighboring the current block may be T.

Adjacent blocks to be mentioned thereafter use A0, A1, A2, B0, B1, B2, B3, and T shown in FIG. 21.

Figure 22A:
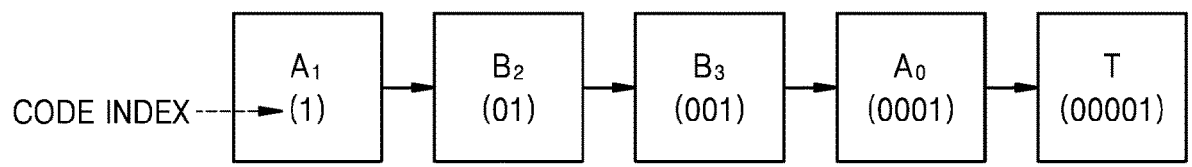
FIGS. 22A, 22B, and 22C illustrate examples of a method of configuring a motion vector prediction value candidate list according to the related art.
Figure 22B:
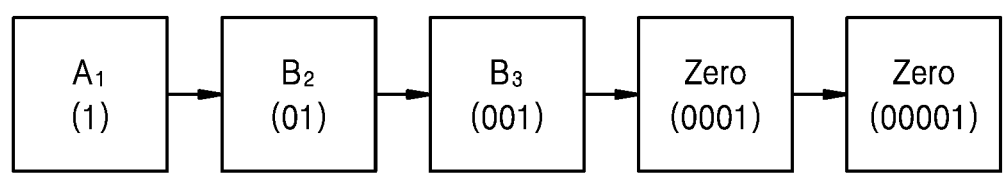
Figure 22C:
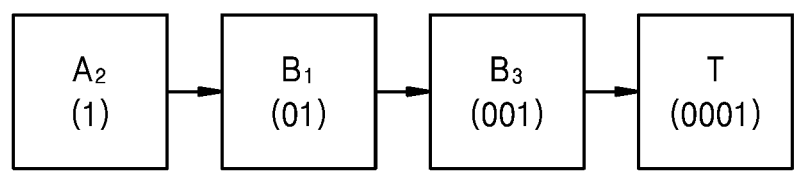

FIGS. 22A, 22B, and 22C illustrate examples of a method of configuring a motion vector prediction value candidate list according to the related art.

The motion vector prediction value candidate list according to the related art is configured by using motion vectors of spatial (Ax, By) or temporal adjacent blocks. In particular, referring to FIG. 22A, when the maximum number of motion vector prediction values is 5, the motion vector prediction value candidate list may be configured with A1, B2, B3, A0, and T from among the adjacent blocks of FIG. 21, and code indices indicating respective candidates may be determined to be 1, 01, 001, 0001, and 00001 in a highest-priority order.

Referring to FIG. 22B, according to the related art, when a motion vector is insufficient in the motion vector candidate list, i.e., as shown in FIG. 22B, when only A1, B2, and B3 are present as a motion vector of an adjacent block, the motion vector candidate list may be configured in a manner that zero motion vectors are determined to be two motion vectors that are insufficient for the maximum number of motion vectors.

Referring to FIG. 22C, according to the related art, when the maximum number of motion vector prediction values is 4, the motion vector prediction value candidate list may be configured with A2, B1, B3, and T from among the adjacent blocks of FIG. 21, and code indices indicating respective candidates may be determined to be 1, 01, 001, and 0001 in a highest-priority order.

Figure 23A:
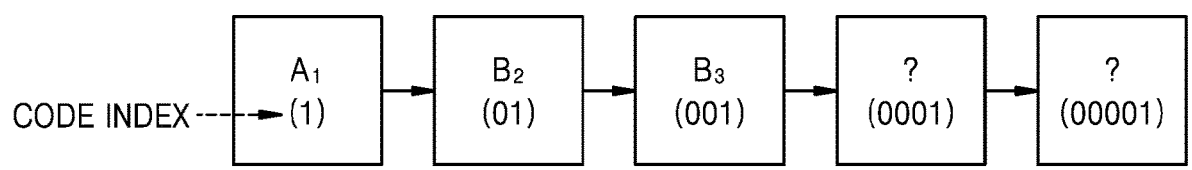
FIGS. 23A and 23B illustrate examples of a case where a motion vector is insufficient in a motion vector prediction value candidate list.
Figure 23B:
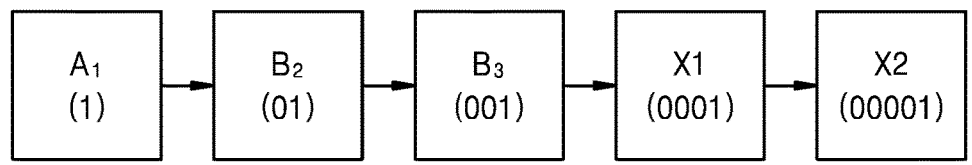

FIGS. 23A and 23B illustrate examples of a case where a motion vector is insufficient in a motion vector prediction value candidate list.

Referring to FIG. 23A, when the maximum number of motion vectors of a motion vector candidate list is 5, only A1, B2, and B3 of different motion vectors are present from among the adjacent blocks, and thus two motion vectors are insufficient, such that additional motion vectors are required.

According to an embodiment, a motion vector candidate list may be configured in a manner that motion vectors are added by using adjacent blocks. First, a base motion vector that can be a criterion from among the adjacent blocks may be determined. One or more offsets from among predetermined offset information are added to the determined base motion vector and thus additional motion vector candidates may be generated, and then the generated additional motion vector candidates may be added to the motion vector candidate list. A motion vector having best performance may be selected in the motion vector candidate list including the additional motion vector candidates, and a code index corresponding to the selected motion vector may be signaled to be used as a final motion vector prediction value.

According to an embodiment, the base motion vector may be selected from among motion vectors that are filtered out through pruning in a motion vector candidate list configuring process.

With reference to FIG. 23B, provided is a method of determining motion vectors of X1 and X2 when the maximum number of motion vectors of a motion vector candidate list is 5, and only A1, B2, and B3 of different motion vectors are present from among adjacent blocks.

According to an embodiment, a motion vector of A1 having the highest priority from among A1, B2, and B3 may be determined as a base motion vector.

Figure 24:
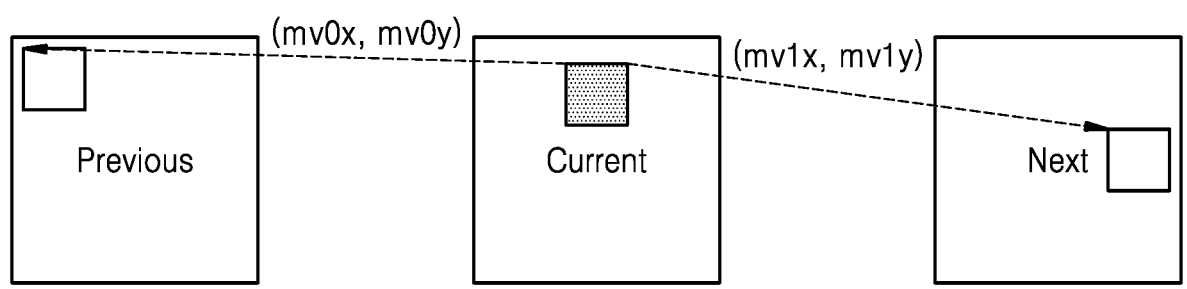
FIG. 24 illustrates an example of a base motion vector in a bi-directional prediction.

FIG. 24 illustrates an example of a base motion vector in a bi-directional prediction.

Referring to FIGS. 23B and 24, in the bi-directional prediction, when a motion vector of a reference list 0 of A1 block is (MV0$x$, MV0$y$), and a motion vector of a reference list 1 of A1 block is (MV1$x$, MV1$y$), the motion vectors being determined as a base motion vector, the base motion vector may be determined to be {(MV0$x$, MV0$y$), (MV1$x$, MV1$y$)}.

Therefore, a predetermined offset value is added to the motion vectors of A1 which correspond to the base motion vector, such that additional motion vector candidates of X1 and X2 may be generated. In particular, the additional motion vector candidate of X1 may be determined to be {(MV0$x$+a1, MV0$y$+b1), (MV1$x$+c1, MV1$y$+d1)}, and the additional motion vector candidate of X2 may be determined to be {(MV0$x$+a2, MV0$y$+b2), (MV1$x$+c2, MV1$y$+d2)}. Offset values of a1, a2, b1, b2, c1, c2, d1, and d2 may be equal to each other or may be arbitrary values different from each other.

Figure 25:
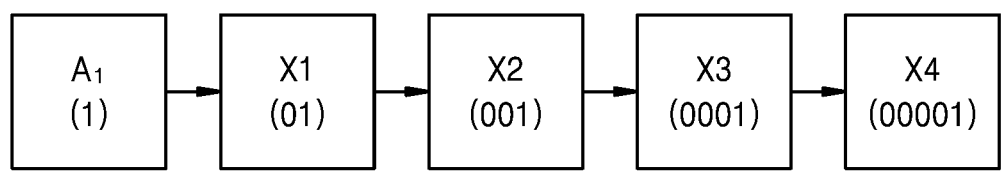
FIG. 25 illustrates another example of a case where a motion vector is insufficient in a motion vector prediction value candidate list.

FIG. 25 illustrates another example of the case where a motion vector is insufficient in a motion vector prediction value candidate list.

Referring to FIG. 25, provided is a method of determining motion vectors of X1, X2, X3, and X4 when the maximum number of motion vectors of a motion vector candidate list is 5, and only a motion vector of A1 is present from among adjacent blocks.

Referring to FIGS. 24 and 25, a predetermined offset value is added to the motion vector of A1 which corresponds to a base motion vector, such that additional motion vector candidates of X1, X2, X3, and X4 may be generated. In particular, the additional motion vector candidate of X1 may be determined to be {(MV0x+a1, MV0y+b1), (MV1x+c1, MV1y+d1)}, the additional motion vector candidate of X2 may be determined to be {(MV0x+a2, MV0y+b2), (MV1x+c2, MV1y+d2)}, the additional motion vector candidate of X3 may be determined to be {(MV0x+a3, MV0y+b3), (MV1x+c3, MV1y+d3)}, and the additional motion vector candidate of X4 may be determined to be {(MV0x+a4, MV0y+b4), (MV1x+c4, MV1y+d4)}. Offset values of a1, a2, a3, a4, b1, b2, b3, b4, c1, c2, c3, c4, d1, d2, d3, and d4 may be equal to each other or may be arbitrary values different from each other. For example, the additional motion vector candidate of X1 may be determined to be {(MV0x+1, MV0y+0), (MV1x−1, MV1y+0)}, the additional motion vector candidate of X2 may be determined to be {(MV0x−1, MV0y+0), (MV1x+1, MV1y+0)}, the additional motion vector candidate of X3 may be determined to be {(MV0x+0, MV0y+1), (MV1x+0, MV1y−1)}, and the additional motion vector candidate of X4 may be determined to be {(MV0x+0, MV0y−1), (MV1x+0, MV1y+1)}. As another example, the additional motion vector candidate of X1 may be determined to be {(MV0x+4, MV0y+0), (MV1x−4, MV1y+0)}, the additional motion vector candidate of X2 may be determined to be {(MV0x−4, MV0y+0), (MV1x+4, MV1y+0)}, the additional motion vector candidate of X3 may be determined to be {(MV0x+0, MV0y+4), (MV1x+0, MV1y−4)}, and the additional motion vector candidate of X4 may be determined to be {(MV0x+0, MV0y−4), (MV1x+0, MV1y+4)}.

Figure 26:
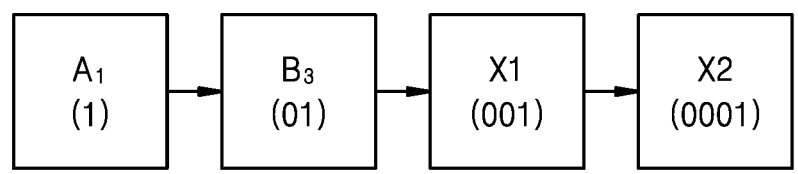
FIG. 26 illustrates another example of a case where a motion vector is insufficient in a motion vector prediction value candidate list.

FIG. 26 illustrates another example of the case where a motion vector is insufficient in a motion vector prediction value candidate list.

With reference to FIG. 26, provided is a method of determining motion vectors of X1 and X2 when the maximum number of motion vectors of a motion vector candidate list is 4, and only A1 and B3 of different motion vectors are present from among adjacent blocks.

According to an embodiment, a plurality of motion vectors may be selected as a base motion vector. Referring to FIG. 26, a motion vector of A1 block may be determined as a first base motion vector, and a motion vector of B3 block may be determined as a second base motion vector. In a bi-directional prediction, when a motion vector of a reference list 0 of A1 block is (MV0x, MV0y), and a motion vector of a reference list 1 of A1 block is (MV1x, MV1y), the first base motion vector may be determined to be {(MV0x, MV0y), (MV1x, MV1y)}, and a motion vector of a reference list 0 of B3 block is (MV0x', MV0y'), and a motion vector of a reference list 1 of A1 block is (MV1x', MV1y'), the second base motion vector may be determined to be {(MV0x', MV0y'), (MV1x', MV1y')}. By using the determined first base motion vector and the second base motion vector, an additional motion vector candidate of X1 may be determined to be {(MV0x+a1, MV0y+b1), (MV1x+c1, MV1y+d1)}, and an additional motion vector candidate of X2 may be determined to be {(MV0x'+a2, MV0y'+b2), (MV1x'+c2, MV1y'+d2)}. Offset values of a1, a2, b1, b2, c1, c2, d1, and d2 may be equal to each other or may be arbitrary values different from each other.

Figure 27:
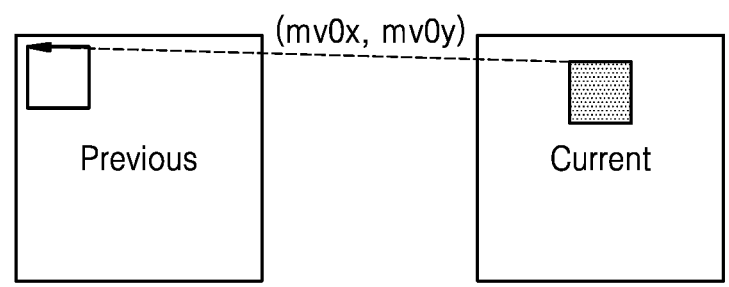
FIG. 27 illustrates an example of a base motion vector in a uni-directional prediction.

FIG. 27 illustrates an example of a base motion vector in a uni-directional prediction.

Referring to FIG. 27, in the uni-directional prediction, a motion vector of a reference list 0 of a block, the motion vector being determined as a base motion vector, may be (MV0x, MV0y).

Referring to FIGS. 25 and 27, a predetermined offset value is added to the motion vector of A1 which corresponds to the base motion vector, such that additional motion vector candidates of X1, X2, X3, and X4 may be generated. In particular, in the uni-directional prediction, the additional motion vector candidate of X1 may be determined to be (MV0x+a1, MV0y+b1), the additional motion vector candidate of X2 may be determined to be (MV0x+a2, MV0y+b2), the additional motion vector candidate of X3 may be determined to be (MV0x+a3, MV0y+b3), and the additional motion vector candidate of X4 may be determined to be (MV0x+a4, MV0y+b4). Offset values of a1, a2, a3, a4, b1, b2, b3, and b4 may be equal to each other or may be arbitrary values different from each other. For example, the additional motion vector candidate of X1 may be determined to be (MV0x+1, MV0y+0), the additional motion vector candidate of X2 may be determined to be (MV0x−1, MV0y+0), the additional motion vector candidate of X3 may be determined to be (MV0x+0, MV0y+1), and the additional motion vector candidate of X4 may be determined to be (MV0x+0, MV0y−1).

Figure 28:
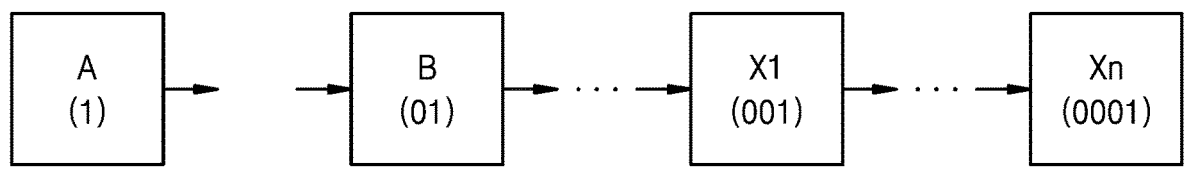
FIG. 28 illustrates another example of a case where a motion vector is insufficient in a motion vector prediction value candidate list.
Figure 29:
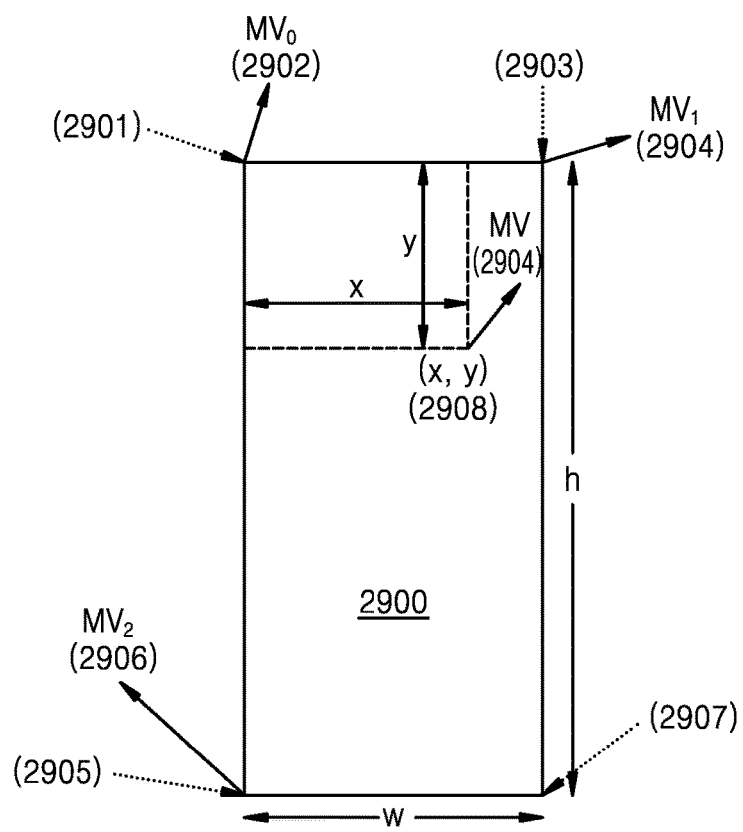
FIG. 29 illustrates an example of deriving a motion vector to be applied to a sample of a current block in an affine mode.

FIG. 28 illustrates another example of the case where a motion vector is insufficient in a motion vector prediction value candidate list.

Referring to FIG. 28, provided is a method of generating an additional motion vector candidate when different motion vectors are motion vectors of A to B blocks from among adjacent blocks, and n motion vectors X1 to Xn are insufficient.

According to an embodiment, motion vectors of A1 and B3 blocks from among A to B blocks may be determined as base motion vectors. In detail, a motion vector of A1 block may be determined as a first base motion vector, and a motion vector of B3 block may be determined as a second base motion vector. In a bi-directional prediction, when a motion vector of a reference list 0 of A1 block is (MV0x, MV0y), and a motion vector of a reference list 1 of A1 block is (MV1x, MV1y), the first base motion vector may be determined to be {(MV0x, MV0y), (MV1x, MV1y)}, and a motion vector of a reference list 0 of B3 block is (MV0x', MV0y'), and a motion vector of a reference list 1 of A1 block is (MV1x', MV1y'), the second base motion vector may be determined to be {(MV0x', MV0y'), (MV1x', MV1y')}. By using the determined first base motion vector and the second base motion vector, an additional motion vector candidate of X1 may be determined to be {(MV0x+a1, MV0y+b1), (MV1x+c1, MV1y+d1)}, and an additional motion vector candidate of Xk ($k^{th}$ additional motion vector) may be determined to be {(MV0x'+a2, MV0y'+b2), (MV1x'+c2, MV1y'+d2)}. Similarly, additional motion vectors of X2 to Xk−1 and Xk+1 to Xn may be determined. Offset values of a1, a2, b1, b2, c1, c2, d1, and d2 may be equal to each other or may be arbitrary values different from each other.

FIG. 29 illustrates an example for deriving a motion vector to be applied to a sample of a current block in an affine mode.

In the affine mode, at least three affine parameters are required to derive a motion vector of a sample of a current block 2900. In particular, the affine mode may include a 6-parameter affine mode, a 4-parameter affine mode, and a 3-parameter affine mode. Hereinafter, a method of deriving the motion vector of the sample of the current block 2900 according to each affine mode will now be described.

In the 6-parameter affine mode, the processor 1720 may obtain three motion vectors, i.e., first through third motion vectors 2902, 2904, and 2906 from adjacent samples at an upper left coordinate 2901, an upper right coordinate 2903, and a lower left coordinate 2905 of the current block 2900. The first motion vector 2902 may be obtained from the adjacent samples at the upper left coordinate 2901 of the current block 2900. Also, the second motion vector 2904 may be obtained from the adjacent samples of the upper right coordinate 2903 of the current block 2900. Also, the third motion vector 2906 may be obtained from the adjacent samples of the lower left coordinate 2905 of the current block 2900. In FIG. 29, the third motion vector 2906 is obtained based on the lower left coordinate 2905 of the current block 2900, but according to an embodiment, the third motion vector 2906 may be obtained based on a lower right coordinate 2907 of the current block 2900. Also, the processor 1720 may determine x and y components of the first motion vector 2902, x and y components of the second motion vector 2904, and x and y components of the third motion vector 2906 as affine parameters.

According to an embodiment, the first motion vector 2902 may be determined to be an average of motion vectors of a plurality of adjacent blocks neighboring the upper left coordinate 2901 of the current block 2900. Similarly, the second motion vector 2904 may be determined to be an average of motion vectors of a plurality of adjacent blocks neighboring the upper right coordinate 2903 of the current block 2900. Also, the third motion vector 2906 may be determined to be an average of motion vectors of a plurality of adjacent blocks adjacent to the lower left coordinate 2905 or lower right coordinate 2907 of the current block 2900.

A motion vector 2910 of a sample 2908 of the current block 2900 may be determined according to the first motion vector 2902, the second motion vector 2904, and the third motion vector 2906, according to Equations 1 to 3.

In Equations 1 to 3, x denotes a horizontal distance difference between the upper left coordinate 2901 of the current block 2900 and the sample 2908 of the current block 2900, and y denotes a vertical distance difference between the upper left coordinate 2901 of the current block 2900 and the sample 2908 of the current block 2900. $MV_0$ denotes the first motion vector 2902, $MV_1$ denotes the second motion vector 2904, and $MV_2$ denotes the third motion vector 2906. MV denotes the motion vector 2910 of the sample 2908 of the current block 2900. w denotes the width of the current block 2900 and h denotes the height of the current block 2900. $dMV_x$ denotes a horizontal change rate of the motion vector 2910 and $dMV_y$ denotes a vertical change rate of the motion vector 2910.

$$dMV_x=(MV_1-MV_0)/w \qquad \text{[Equation 1]}$$

$$dMV_y=(MV_2-MV_0)/h \qquad \text{[Equation 2]}$$

$$MV=MV_0+x \cdot dMV_x+y \cdot dMV_y \qquad \text{[Equation 3]}$$

Equation 1 represents a method of obtaining the horizontal change rate $dMV_x$ of the motion vector 2910. According to Equation 1, a value obtained by dividing a value, in which the first motion vector 2902 is subtracted from the second motion vector 2904, by the width of the current block 2900 is determined as the horizontal change rate of the motion vector 2910.

Equation 2 represents a method of obtaining the vertical change rate $dMV_y$ of the motion vector 2910. According to Equation 2, a value obtained by dividing a value, in which the first motion vector 2902 is subtracted from the third motion vector 2906, by the height of the current block 2900 is determined as the vertical change rate of the motion vector 2910.

Equation 3 represents a method of obtaining the motion vector 2910. According to Equation 3, the motion vector 2910 is determined to be a value obtained by adding inner product values of (x, y), which are coordinates of the sample 2908 of the current block 2900 with respect to the upper left coordinate 2901 of the current block 2900, and ($dMV_x$, $dMV_y$) indicating the vertical change rate and the horizontal change rate, to the first motion vector 2902 ($MV_0$).

According to Equations 1 to 3, motion vectors of all samples or sub-blocks included in the current block 2900 may be determined. According to Equations 1 to 3, motion vectors of samples may be determined differently based on locations of the samples. Equations 1 and 2 may be applied when vertical components of coordinates from which the first motion vector 2902 and the second motion vector 2904 are extracted are the same and horizontal components of coordinates from which the first motion vector 2902 and the third motion vector 2906 are extracted are the same. Accordingly, a generalized equation for determining a motion vector of the current block 2900 will be described below with reference to FIG. 28.

In the 6-parameter affine mode, the motion vector 2910 is determined by three motion vectors, and thus, a reference block of the current block 2900 may be zoomed, rotated, and sheared from the current block 2900.

In the 4-parameter affine mode, the processor 1720 may obtain two motion vectors, i.e., the first and second motion vectors 2902 and 2904, from adjacent samples of the current block 2900. As in the 6-parameter affine mode, the first motion vector 2902 may be obtained from the adjacent samples of an upper left coordinate of the current block 2900. Equally, the second motion vector 2904 may be obtained from the adjacent samples of an upper right coordinate of the current block 2900. Also, the processor 1720 may determine the x and y components of the first motion vector 2902 and the x and y components of the second motion vector 2904 as affine parameters.

In the 4-parameter affine mode, the third motion vector 2906 is not determined from the lower left coordinate or the lower right coordinate of the current block 2900, but is determined by combining the first motion vector 2902 and the second motion vector 2904.

Equations 4 and 5 represent a method of determining the third motion vector 2906 by combining the first motion vector 2902 and the second motion vector 2904. In Equations 4 and 5, x denotes a horizontal component of a motion vector and y denotes a vertical component of the motion vector. $MV_0$ denotes the first motion vector 2902, $MV_1$ denotes the second motion vector 2904, and $MV_2$ denotes the third motion vector 2906. w denotes the width of the current block 2900 and h denotes the height of the current block 2900.

$$MV_2[x]=(MV_1[y]-MV_0[y])*w/h+MV_0[x] \qquad \text{[Equation 4]}$$

$$MV_2[y]=(MV_0[x]-MV_1[x])*w/h+MV_0[y] \qquad \text{[Equation 5]}$$

According to Equation 4, a horizontal coordinate value ($MV_2[x]$) of the third motion vector 2906 is determined to be a value (($MV_1[y]-MV_0[y]$)*w/h+$MV_0[x]$) obtained by adding the horizontal coordinate value ($MV_0[x]$) of the first motion vector 2902 to a multiplication product of a value ($MV_1[y]-MV_0[y]$), in which the vertical coordinate value of the first motion vector 2902 is subtracted from the vertical coordinate value of the second motion vector 2904, and a value (w/h), in which the width of the current block 2900 is divided by the height of the current block 2900.

According to Equation 5, a vertical coordinate value ($MV_2[y]$) of the third motion vector 2906 is determined to be a value (($MV_0[x]-MV_1[x]$)*w/h+$MV_0[y]$) obtained by adding the vertical coordinate value ($MV_0[y]$) of the first motion vector 2902 to a multiplication product of a value ($MV_0[x]-MV_1[x]$), in which the horizontal coordinate value of the second motion vector 2904 is subtracted from the horizontal coordinate value of the first motion vector 2902, and a value (w/h), in which the width of the current block 2900 is divided by the height of the current block 2900.

In the 4-parameter affine mode, the x component and the y component of the third motion vector 2906 are induced from the first motion vector 2902 and the second motion vector 2904. Accordingly, unlike the 6-parameter affine mode, in the 4-parameter affine mode, the reference block of the current block 2900 may be only zoomed and rotated from the current block 2900 based on the first motion vector 2902 and the second motion vector 2904. That is, in the 4-parameter affine mode, the current block 2900 is not sheared.

In the 3-parameter affine mode, the processor 1720 may obtain two motion vectors, i.e., the first and second motion vectors 2902 and 2904, from the adjacent samples of the current block 2900. The first motion vector 2902 may be obtained from the adjacent samples of the upper left coordinate of the current block 2900. Equally, the second motion vector 2904 may be obtained from the adjacent samples of the upper right coordinate of the current block 2900. However, unlike the 4-parameter affine mode, in the 3-parameter affine mode, only the x component or the y component is obtained from the second motion vector 2904. Thus, the processor 1710 may determine the x component and they component of the first motion vector 2902 and the x component or the y component of the second motion vector 2904 as affine parameters.

When the x component of the second motion vector 2904 is obtainable, the y component of the second motion vector 2904 is obtained from the y component of the first motion vector 2902. On the other hand, when the y component of the second motion vector 2904 is obtainable, the x component of the second motion vector 2904 is obtained from the x component and the y component of the first motion vector 2902 and the y component of the second motion vector 2904. Equations 6 and 7 below respectively represent methods of determining the x component and the y component of the second motion vector 2904.

In Equations 6 and 7, x denotes a horizontal component of a motion vector and y denotes a vertical component of the motion vector. $MV_0$ denotes the first motion vector 2902, $MV_1$ denotes the second motion vector 2904, and $MV_2$ denotes the third motion vector 2906. w denotes the width of the current block 2900 and h denotes the height of the current block 2900.

$$MV_1[y]=MV_0[y] \qquad \text{[Equation 6]}$$

$$MV_1[x]=\text{sqrt}(w^2-(MV_1[y]-MV_0[y])^2)+MV_0[x]-w \qquad \text{[Equation 7]}$$

According to Equation 6, when only the x component of the second motion vector 2904 is obtainable, the processor 1720 determines the y component of the second motion vector 2904 to be equal to the y component of the first motion vector 2902.

According to Equation 7, when only the y component of the second motion vector 2904 is obtainable, the processor 1720 determines the x component of the second motion vector 2904 according to the x and y components ($MV_0[x]$, $MV_0[y]$) of the first motion vector 2902 and the y component ($MV_1[y]$) of the second motion vector 2904.

Also, the x component and the y component of the third motion vector 2906 are determined according to Equations 4 and 5 as in the 4-parameter affine mode. In the 3-parameter affine mode, a component that is not obtainable from among the x and y components of the second motion vector 2904 is derived from, together with the third motion vector 2906, the first motion vector 2902 and an obtainable component from among the x and y components of the second motion vector 2904. Thus, in the 3-parameter affine mode, the reference block of the current block 2900 may be only zoomed or rotated from the current block 2900 based on the first motion vector 2902 and the second motion vector 2904. When the x component of the second motion vector 2904 is obtainable, the reference block of the current block 2900 may be only zoomed from the current block 2900. On the other hand, when the y component of the second motion vector 2904 is obtainable, the reference block of the current block 2900 may be only rotated from the current block 2900.

Referring to FIG. 29, when a prediction mode of a current block is one of a skip affine mode, a merge affine mode, and an inter affine mode, a method of adding an additional motion vector candidate to a motion vector candidate list, the method being shown in FIGS. 23A to 28, may be applied to an affine mode. Motion vectors described with reference to FIGS. 23A to 28 may be affine-transformed motion vectors, and the affine-transformed motion vectors may be 4 affine parameters or 6 affine parameters.

For example, in a case where an affine parameter (an affine-transformed motion vector) is insufficient in an affine-transformed motion vector candidate list, i.e., an affine parameter candidate list, one of affine parameter candidates existing in the affine parameter candidate list may be determined as a base affine parameter candidate, an additional affine parameter candidate may be generated by adding an offset value to the base affine parameter candidate and then may be added to the affine parameter candidate list, such that an affine parameter of a current block may be determined by using the additional affine parameter candidate in the affine parameter candidate list.

According to an embodiment, in a case where whether to add a motion vector to a motion vector candidate list of a current block is determined based on a flag, the flag with respect to whether the motion vector is to be added may be signaled at a coding unit level, a frame level, or a sequence level unit.

Figure 19:
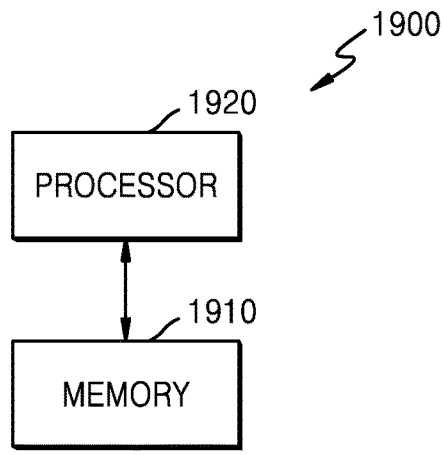
FIG. 19 illustrates a block diagram of a video encoding apparatus 1900 according to an embodiment.
Figure 20:
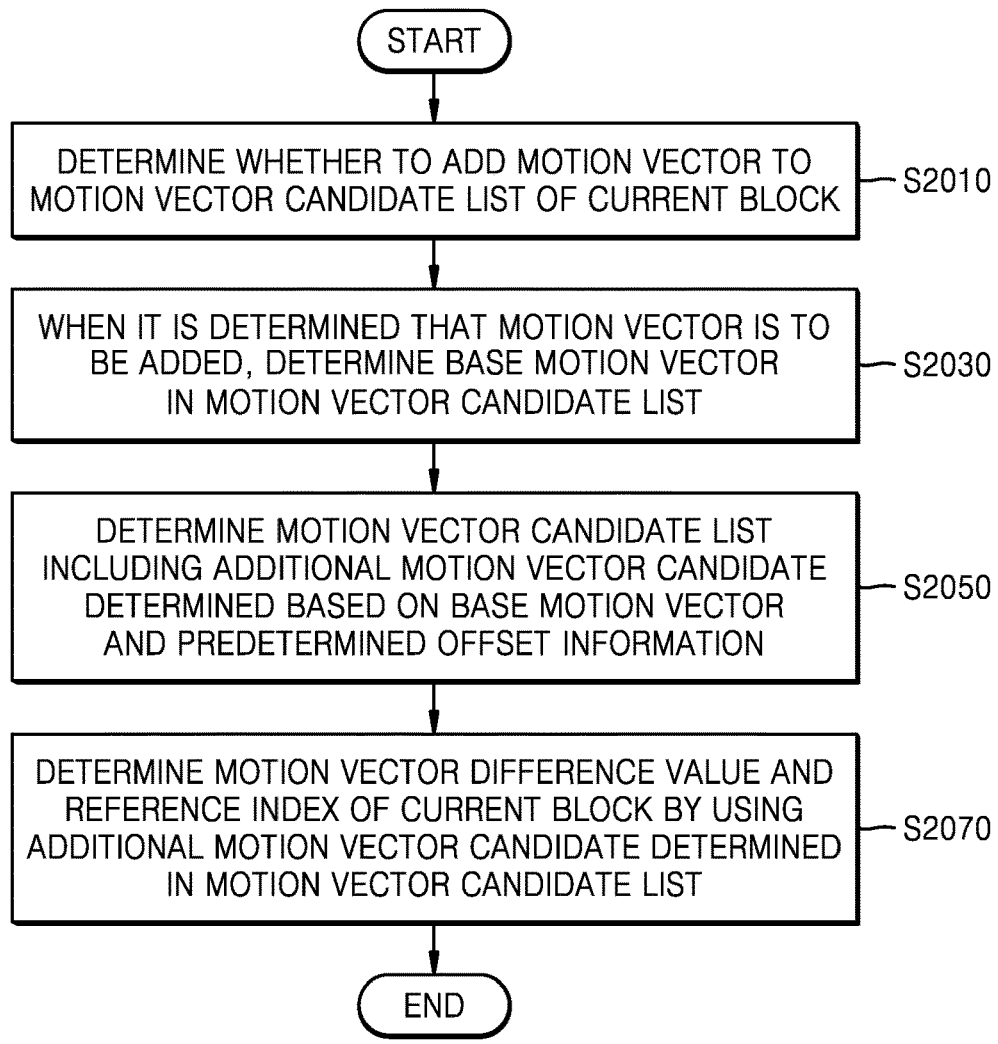
FIG. 20 illustrates a flowchart of a video encoding method according to an embodiment.

FIGS. 19 and 20 illustrate a block diagram of a video encoding apparatus 1900 according to an embodiment and a flowchart of a video encoding method according to an embodiment, which respectively correspond to a video decoding apparatus and a video decoding method described above.

FIG. 19 illustrates a block diagram of the video encoding apparatus 1900 according to an embodiment.

The video encoding apparatus 1900 according to an embodiment may include a memory 1910 and at least one processor 1920 connected with the memory 1910. Operations of the video encoding apparatus 1900 according to an embodiment may be performed by separate processors or may be performed by the control of a central processor. Also, the memory 1910 of the video encoding apparatus 1900 may store external data received from an outer source, and data generated by a processor 1920, examples of the data including information about whether to add a motion vector to a motion vector candidate list of a current block, information about a base motion vector, or the like.

The processor 1920 of the video encoding apparatus 1900 may determine whether to add a motion vector to a motion vector candidate list of a current block, when it is determined to add the motion vector, may determine a base motion vector in the motion vector candidate list, may determine the motion vector candidate list including an additional motion vector candidate determined based on the base motion vector and predetermined offset information, and may determine a motion vector difference value and a reference index of the current block by using the additional motion vector candidate determined in the motion vector candidate list.

Hereinafter, with reference to FIG. 20, operations of the video encoding method performed by the video encoding apparatus 1900 will now be described in detail, the operations including determining whether to add a motion vector to a motion vector candidate list of a current block, when it is determined to add the motion vector, determining a base motion vector in the motion vector candidate list, determining the motion vector candidate list including an additional motion vector candidate determined based on the base motion vector and predetermined offset information, and determining a motion vector difference value and a reference index of the current block by using the additional motion vector candidate determined in the motion vector candidate list.

FIG. 20 illustrates a flowchart of a video encoding method according to an embodiment.

Referring to FIG. 20, in operation S2010, the video encoding apparatus 1900 may determine whether to add a motion vector to a motion vector candidate list of a current block.

According to an embodiment, in a case where the number of motion vectors included in the motion vector candidate list of the current block is insufficient compared to the maximum number of motion vectors of the motion vector candidate list, and, with respect to whether to add a motion vector to the motion vector candidate list of the current block, when it is determined to add the motion vector, an additional motion vector may be determined based on predetermined offset information and a base motion vector that is determined from among the motion vectors included in the motion vector candidate list.

According to an embodiment, whether to add a motion vector to the motion vector candidate list of the current block may be determined that a motion vector is to be added to the motion vector candidate list, when a zero motion vector is included in the motion vector candidate list in a motion vector deriving method according to the related art. That is, whether to add a motion vector to a current motion vector candidate list may be determined that a motion vector is to be added to the motion vector candidate list, when a motion vector is insufficient in the current motion vector candidate list and thus a zero motion vector is included therein.

According to an embodiment, whether to add a motion vector to the motion vector candidate list of the current block may be explicitly encoded to a flag and then may be signaled.

Referring back to FIG. 20, in operation S2030, when it is determined to add the motion vector, the video encoding apparatus 1900 may determine a base motion vector in the motion vector candidate list.

In operation S2050, the motion vector candidate list including an additional motion vector candidate determined based on the base motion vector and predetermined offset information may be determined.

In operation S2070, a motion vector difference value and a reference index of the current block may be determined by using the additional motion vector candidate determined in the motion vector candidate list. In detail, the motion vector difference value and the reference index of the current block may be encoded and then signaled.

The disclosure has been particularly shown and described with reference to embodiments thereof. In this regard, it will be understood by one of ordinary skill in the art that various changes in form and details may be made therein without departing from the scope of the disclosure. Therefore, the embodiments should be considered in a descriptive sense only and not for purposes of limitation. The scope of the disclosure is defined not by the detailed descriptions of the disclosure but by the following claims, and all differences within the scope will be construed as being included in the disclosure.

Meanwhile, the aforedescribed embodiments of the disclosure can be written as a program executable on a computer, and can be implemented in general-use digital computers that execute the program by using a computer-readable recording medium. Examples of the computer-readable recording medium include magnetic storage media (e.g., ROM, floppy disks, hard disks, etc.), optical recording media (e.g., CD-ROMs, or DVDs), or the like.

The invention claimed is:

1. A video decoding method comprising:
   determining whether to add a motion vector to a motion vector candidate list of a current block;
   when it is determined to add the motion vector, determining a base motion vector in the motion vector candidate list;
   determining the motion vector candidate list comprising an additional motion vector candidate determined based on the base motion vector and predetermined offset information; and
   determining a motion vector of the current block by using the additional motion vector candidate determined in the motion vector candidate list,
   wherein, when a prediction mode of the current block is one of a skip affine mode, a merge affine mode, and an inter affine mode,
   wherein the motion vector, the base motion vector, and the additional motion vector candidate of the motion vector candidate list are affine-transformed motion vectors, and
   wherein the affine-transformed motion vectors are 4 affine parameters.

2. The video decoding method of claim 1, wherein the base motion vector is selected from among motion vectors of adjacent blocks neighboring the current block.

3. The video decoding method of claim 1, wherein a plurality of motion vectors are determined as the base motion vector.

4. The video decoding method of claim 1, wherein the predetermined offset information comprises at least one offset value.

5. The video decoding method of claim 1, wherein the base motion vector comprises a motion vector that is not selected in a process of configuring the motion vector candidate list.

6. A video decoding method comprising:
   determining whether to add a motion vector to a motion vector candidate list of a current block;

when it is determined to add the motion vector, determining a base motion vector in the motion vector candidate list;

determining the motion vector candidate list comprising an additional motion vector candidate determined based on the base motion vector and predetermined offset information; and determining a motion vector of the current block by using the additional motion vector candidate determined in the motion vector candidate list, wherein, when a prediction mode of the current block is one of a skip affine mode, a merge affine mode, and an inter affine mode, wherein the motion vector, the base motion vector, and the additional motion vector candidate of the motion vector candidate list are affine-transformed motion vectors, and wherein the affine-transformed motion vectors are 6 affine parameters.

7. The video decoding method of claim 1, wherein the predetermined offset information comprises a value obtained from signaled information.

8. A video encoding method comprising:

determining whether to add a motion vector to a motion vector candidate list of a current block;

when it is determined to add the motion vector, determining a base motion vector in the motion vector candidate list;

determining the motion vector candidate list comprising an additional motion vector candidate determined based on the base motion vector and predetermined offset information; and determining a motion vector difference value and a reference index of the current block by using the additional motion vector candidate determined in the motion vector candidate list;

wherein, when a prediction mode of the current block is one of a skip affine mode, a merge affine mode, and an inter affine mode, wherein the motion vector, the base motion vector, and the additional motion vector candidate of the motion vector candidate list are affine-transformed motion vectors, and wherein the affine-transformed motion vectors are 4 affine parameters.

9. A video decoding apparatus comprising:

a memory; and at least one processor connected with the memory, wherein the at least one processor is configured to determine whether to add a motion vector to a motion vector candidate list of a current block, when it is determined to add the motion vector, determine a base motion vector in the motion vector candidate list, determine the motion vector candidate list comprising an additional motion vector candidate determined based on the base motion vector and predetermined offset information, and determine a motion vector of the current block by using the additional motion vector candidate determined in the motion vector candidate list, wherein, when a prediction mode of the current block is one of a skip affine mode, a merge affine mode, and an inter affine mode, wherein the motion vector, the base motion vector, and the additional motion vector candidate of the motion vector candidate list are affine-transformed motion vectors, and wherein the affine-transformed motion vectors are 4 affine parameters.

* * * * *